(12) United States Patent
Gelbman

(10) Patent No.: US 7,871,001 B2
(45) Date of Patent: *Jan. 18, 2011

(54) REMOTELY-ALTERABLE ELECTRONIC-INK BASED DISPLAY DEVICE EMPLOYING AN ELECTRONIC-INK LAYER INTEGRATED WITHIN A STACKED ARCHITECTURE

(75) Inventor: Alexander Gelbman, Mountain Lakes, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/154,427

(22) Filed: May 22, 2008

(65) Prior Publication Data

US 2009/0014531 A1 Jan. 15, 2009

Related U.S. Application Data

(63) Continuation of application No. 11/196,776, filed on Aug. 2, 2005, now abandoned, which is a continuation of application No. 09/393,553, filed on Sep. 10, 1999, now Pat. No. 6,924,781.

(60) Provisional application No. 60/099,888, filed on Sep. 11, 1998.

(51) Int. Cl.
*G06K 7/08* (2006.01)
(52) U.S. Cl. .................. 235/451; 235/383; 235/375; 235/492; 235/385; 340/5.91
(58) Field of Classification Search .......... 235/451, 235/383, 375, 492, 385; 340/5.91
See application file for complete search history.

(56) References Cited

U.S. PATENT DOCUMENTS 3,668,106 A 6/1972 Ota (Continued)

FOREIGN PATENT DOCUMENTS

EP 1058147 A2 12/2000

(Continued)

OTHER PUBLICATIONS

Nicholas Negroponte, "Surface and Displays", Wired issue No. 3.01, Jan. 1, 1997. 3 pages.

(Continued)

*Primary Examiner*—Michael G Lee
*Assistant Examiner*—Kristy A Haupt
(74) *Attorney, Agent, or Firm*—Thomas J. Perkowski, Esq., P.C.

(57) ABSTRACT

A remotely-alterable electronic-ink based display device employing an addressable display assembly including a layer of electronic ink including a bi-stable non-volatile imaging material. The device includes an integrated circuit structure having a storage element for storing instructions, programs and data, and a programmed processor in electrical communication with the addressable display assembly and an antenna structure. A signal transmitting structure transmits signals from the antenna structure to the remote activator module. A signal receiving structure receives electromagnetic signals from the remote activator module, using the antenna structure. An on-board battery power structure, operably connected to the integrated circuit structure, supplies electrical power the integrated circuit structure, which is responsive to electromagnetic signals received from the remote activator module by the antenna structure and the signal receiving structure. The addressable display assembly is responsive to output signals generated by the programmed processor, to display the determined graphical indicia. The antenna structure, integrated circuit structure, signal transmitting structure, signal receiving structure, on-board battery power structure are arranged and stacked together behind and within the spatial extent of the addressable display assembly so as to form the remotely-alterable electronic-ink based display device having a stacked construction.

36 Claims, 7 Drawing Sheets

U.S. PATENT DOCUMENTS

| | | |
|---|---|---|
| 3,756,693 A | 9/1973 | Ota |
| 3,792,308 A | 2/1974 | Ota |
| 3,892,568 A | 7/1975 | Ota |
| 4,002,886 A | 1/1977 | Sundelin |
| 4,093,534 A | 6/1978 | Carter et al. |
| 4,126,854 A | 11/1978 | Sheridon |
| 4,139,149 A | 2/1979 | Crepeau et al. |
| 4,143,103 A | 3/1979 | Sheridon |
| 4,211,668 A | 7/1980 | Tate |
| 4,218,302 A | 8/1980 | Dalisa et al. |
| 4,272,596 A | 6/1981 | Harbour et al. |
| 4,298,448 A | 11/1981 | Muller et al. |
| 4,336,536 A | 6/1982 | Kalt et al. |
| 4,419,383 A | 12/1983 | Lee |
| 4,435,047 A | 3/1984 | Fergason |
| 4,500,880 A | 2/1985 | Gomersall et al. |
| 4,522,472 A | 6/1985 | Liebert et al. |
| 4,640,583 A | 2/1987 | Hoshikawa et al. |
| 4,654,514 A | 3/1987 | Watson et al. |
| 4,655,897 A | 4/1987 | DiSanto et al. |
| 4,711,996 A | 12/1987 | Drexler |
| 4,742,345 A | 5/1988 | DiSanto et al. |
| 4,746,917 A | 5/1988 | DiSanto et al. |
| 4,766,295 A | 8/1988 | Davis et al. |
| 4,789,858 A | 12/1988 | Fergason et al. |
| 4,794,370 A | 12/1988 | Simpson et al. |
| 4,800,255 A | 1/1989 | Imran |
| 4,807,169 A | 2/1989 | Overbeck |
| 4,822,990 A | 4/1989 | Tamada et al. |
| 4,937,586 A | 6/1990 | Stevems et al. |
| 4,948,232 A | 8/1990 | Lange |
| 4,973,952 A | 11/1990 | Malec et al. |
| 5,001,696 A | 3/1991 | Baldwin |
| 5,003,472 A | 3/1991 | Perrill et al. |
| 5,043,561 A | 8/1991 | Kimata |
| 5,049,862 A | 9/1991 | Dao et al. |
| 5,057,363 A | 10/1991 | Nakanishi |
| 5,111,196 A | 5/1992 | Hunt |
| 5,130,519 A | 7/1992 | Bush |
| 5,164,887 A | 11/1992 | Sakai et al. |
| 5,167,508 A | 12/1992 | McTaggart |
| 5,172,314 A | 12/1992 | Poland et al. |
| 5,180,902 A | 1/1993 | Schick et al. |
| 5,213,853 A | 5/1993 | Noonan |
| 5,216,530 A | 6/1993 | Pearlman et al. |
| 5,220,316 A | 6/1993 | Kazan |
| 5,250,388 A | 10/1993 | Schoch, Jr. et al. |
| 5,262,098 A | 11/1993 | Crowley et al. |
| 5,280,527 A | 1/1994 | Gullman et al. |
| 5,323,150 A | 6/1994 | Tuttle |
| 5,344,594 A | 9/1994 | Sheridon |
| 5,361,871 A | 11/1994 | Gupta et al. |
| 5,382,784 A | 1/1995 | Eberhardt |
| 5,401,947 A | 3/1995 | Poland |
| 5,407,357 A | 4/1995 | Cutler |
| 5,412,192 A | 5/1995 | Hoss |
| 5,428,805 A | 6/1995 | Morgan |
| 5,437,811 A | 8/1995 | Doane et al. |
| 5,442,343 A | 8/1995 | Cato et al. |
| 5,445,906 A | 8/1995 | Hobson et al. |
| 5,448,226 A | 9/1995 | Failing, Jr. et al. |
| 5,459,796 A | 10/1995 | Boyer |
| 5,465,085 A | 11/1995 | Caldwell et al. |
| 5,467,474 A | 11/1995 | Ackerman et al. |
| 5,473,146 A | 12/1995 | Goodwin, III |
| 5,478,994 A | 12/1995 | Rahman et al. |
| 5,485,176 A | 1/1996 | Ohara et al. |
| 5,491,495 A | 2/1996 | Ward et al. |
| 5,504,475 A | 4/1996 | Houdou et al. |
| 5,537,126 A | 7/1996 | Kayser et al. |
| 5,537,312 A | 7/1996 | Sekiguchi et al. |
| 5,539,393 A | 7/1996 | Barfod |
| 5,548,282 A | 8/1996 | Escritt et al. |
| 5,561,446 A | 10/1996 | Montlick |
| 5,571,741 A | 11/1996 | Leedy |
| 5,572,653 A | 11/1996 | DeTemple et al. |
| 5,575,554 A | 11/1996 | Guritz |
| 5,604,027 A | 2/1997 | Sheridon |
| 5,623,552 A | 4/1997 | Lane |
| 5,632,010 A | 5/1997 | Briechle et al. |
| 5,641,974 A | 6/1997 | den Boer et al. |
| 5,655,136 A | 8/1997 | Morgan |
| 5,673,417 A | 9/1997 | Liao |
| 5,680,185 A | 10/1997 | Kobayashi et al. |
| 5,682,143 A | 10/1997 | Brady et al. |
| 5,704,049 A | 12/1997 | Briechle |
| 5,715,622 A | 2/1998 | Giordano, Jr. |
| 5,729,242 A | 3/1998 | Margerum et al. |
| 5,736,967 A | 4/1998 | Kayser et al. |
| 5,737,423 A | 4/1998 | Manduley |
| 5,745,775 A | 4/1998 | Ahlm et al. |
| 5,751,257 A | 5/1998 | Sutherland |
| 5,764,221 A | 6/1998 | Willard |
| 5,768,217 A | 6/1998 | Sonoda et al. |
| 5,776,803 A | 7/1998 | Young |
| 5,777,903 A | 7/1998 | Piosenka et al. |
| 5,779,839 A | 7/1998 | Tuttle et al. |
| 5,786,626 A | 7/1998 | Brady et al. |
| 5,786,875 A | 7/1998 | Brader et al. |
| 5,793,029 A | 8/1998 | Goodwin, III |
| 5,794,211 A | 8/1998 | Goodwin, III et al. |
| 5,796,121 A | 8/1998 | Gates |
| 5,817,207 A | 10/1998 | Leighton |
| 5,825,529 A | 10/1998 | Crowley |
| 5,828,315 A | 10/1998 | Goodwin, III |
| 5,828,432 A | 10/1998 | Shashidhar et al. |
| 5,835,377 A | 11/1998 | Bush |
| 5,841,365 A | 11/1998 | Rimkus |
| 5,847,798 A | 12/1998 | Yang et al. |
| 5,850,187 A | 12/1998 | Carrender et al. |
| 5,854,474 A | 12/1998 | Goodwin, III |
| 5,856,858 A | 1/1999 | Carey et al. |
| 5,861,817 A | 1/1999 | Palmer et al. |
| 5,864,325 A | 1/1999 | Briechle et al. |
| 5,872,552 A | 2/1999 | Gordon, II et al. |
| 5,884,271 A | 3/1999 | Pitroda |
| 5,907,142 A | 5/1999 | Kelsey |
| 5,907,143 A | 5/1999 | Goodwin, III |
| 5,914,670 A | 6/1999 | Goodwin, III et al. |
| 5,918,212 A | 6/1999 | Goodwin, III |
| 5,926,797 A | 7/1999 | Goodwin, III |
| 5,929,770 A | 7/1999 | Faita |
| 5,930,026 A | 7/1999 | Jacobson et al. |
| 5,931,764 A | 8/1999 | Freeman et al. |
| 5,942,978 A | 8/1999 | Shafer |
| 5,945,950 A | 8/1999 | Elbadawy |
| 5,949,335 A | 9/1999 | Maynard |
| 5,955,951 A | 9/1999 | Wischerop et al. |
| 5,955,961 A | 9/1999 | Wallerstein |
| 5,963,133 A | 10/1999 | Monjo |
| 5,969,711 A | 10/1999 | Menzel |
| 5,975,416 A | 11/1999 | Chow et al. |
| 5,977,998 A | 11/1999 | Briechle et al. |
| 6,012,040 A | 1/2000 | Goodwin, III |
| 6,017,584 A | 1/2000 | Albert et al. |
| 6,019,286 A | 2/2000 | Li et al. |
| 6,025,896 A | 2/2000 | Hattori et al. |
| 6,026,373 A | 2/2000 | Goodwin, III |
| 6,027,958 A | 2/2000 | Vu et al. |
| 6,032,857 A | 3/2000 | Kitagawa et al. |
| 6,043,751 A | 3/2000 | Goodwin, III |
| 6,047,263 A | 4/2000 | Goodwin, III |
| 6,054,973 A | 4/2000 | Hughes et al. |
| 6,055,091 A | 4/2000 | Sheridon et al. |

| | | | |
|---|---|---|---|
| 6,061,107 A | 5/2000 | Yang et al. | |
| 6,073,843 A | 6/2000 | Goodwin, III et al. | |
| 6,076,071 A | 6/2000 | Freeny, Jr. | |
| 6,078,251 A | 6/2000 | Landt et al. | |
| 6,080,606 A | 6/2000 | Gleskova et al. | |
| 6,087,196 A | 7/2000 | Sturm et al. | |
| 6,089,453 A | 7/2000 | Kayser et al. | |
| 6,094,642 A | 7/2000 | Stephenson et al. | |
| 6,105,004 A | 8/2000 | Halperin et al. | |
| 6,105,290 A | 8/2000 | Coates et al. | |
| 6,118,426 A | 9/2000 | Albert et al. | |
| 6,120,588 A | 9/2000 | Jacobson | |
| 6,124,851 A | 9/2000 | Jacobson | |
| 6,140,899 A | 10/2000 | Kayser et al. | |
| 6,146,716 A | 11/2000 | Narang | |
| 6,147,606 A | 11/2000 | Duan | |
| 6,147,791 A | 11/2000 | Sheridon | |
| 6,151,096 A | 11/2000 | McDonnell et al. | |
| 6,154,190 A | 11/2000 | Yang et al. | |
| 6,156,450 A | 12/2000 | Bailey | |
| 6,166,638 A | 12/2000 | Brady et al. | |
| 6,169,483 B1 | 1/2001 | Ghaffari et al. | |
| 6,181,299 B1 | 1/2001 | Frederick et al. | |
| 6,204,902 B1 | 3/2001 | Kim et al. | |
| 6,222,513 B1 | 4/2001 | Howard et al. | |
| 6,232,870 B1 | 5/2001 | Garber et al. | |
| 6,253,190 B1 | 6/2001 | Sutherland | |
| 6,264,106 B1 | 7/2001 | Bridgelall | |
| 6,269,342 B1 | 7/2001 | Brick et al. | |
| 6,285,492 B1 | 9/2001 | Good et al. | |
| 6,286,762 B1 | 9/2001 | Reynolds et al. | |
| 6,290,128 B2 | 9/2001 | Goodwin, III | |
| 6,307,751 B1 | 10/2001 | Bodony et al. | |
| 6,307,919 B1 | 10/2001 | Yoked | |
| 6,315,195 B1 | 11/2001 | Ramachandran | |
| 6,318,636 B1 | 11/2001 | Reynolds et al. | |
| 6,332,098 B2 | 12/2001 | Ross et al. | |
| 6,335,678 B1 | 1/2002 | Heutschi | |
| 6,348,908 B1 | 2/2002 | Richley et al. | |
| 6,354,493 B1 | 3/2002 | Mon | |
| 6,369,793 B1 | 4/2002 | Zimman | |
| 6,415,978 B1 | 7/2002 | McAllister | |
| 6,415,982 B2 | 7/2002 | Bridhelall et al. | |
| 6,429,776 B1 | 8/2002 | Alicot et al. | |
| 6,438,882 B1 | 8/2002 | Reynolds | |
| 6,445,370 B1 | 9/2002 | Goodwin, III | |
| 6,473,072 B1 | 10/2002 | Comiskey et al. | |
| 6,473,368 B1 | 10/2002 | Stanfield | |
| 6,480,182 B2 | 11/2002 | Turner et al. | |
| 6,486,780 B1 | 11/2002 | Garber et al. | |
| 6,502,754 B1 | 1/2003 | Bhatia et al. | |
| 6,507,279 B2 | 1/2003 | Loof | |
| 6,510,983 B2 | 1/2003 | Horowitz et al. | |
| 6,513,016 B1 | 1/2003 | Freeny, Jr. | |
| 6,516,997 B1 | 2/2003 | Tanazawa et al. | |
| 6,520,411 B1 | 2/2003 | Goodwin, III | |
| 6,525,706 B1 | 2/2003 | Rehkemper et al. | |
| 6,557,760 B2 | 5/2003 | Goodwin, III | |
| 6,608,551 B1 | 8/2003 | Anderson et al. | |
| 6,639,578 B1 | 10/2003 | Comiskey et al. | |
| 6,672,512 B2 | 1/2004 | Bridgelall | |
| 6,677,852 B1 | 1/2004 | Landt | |
| 6,700,491 B2 | 3/2004 | Shafer | |
| 6,707,376 B1 | 3/2004 | Patterson et al. | |
| 6,753,830 B2 | 6/2004 | Gelbman | |
| 6,802,659 B2 | 10/2004 | Cremon et al. | |
| 6,830,181 B1 | 12/2004 | Bennett | |
| 6,838,989 B1 | 1/2005 | Mays et al. | |
| 6,906,632 B2 | 6/2005 | DeLine et al. | |
| 6,954,133 B2 | 10/2005 | McGregor et al. | |
| 6,980,196 B1 | 12/2005 | Turner et al. | |
| 7,019,651 B2 | 3/2006 | Hall et al. | |
| 7,119,759 B2 | 10/2006 | Zehner et al. | |
| 7,140,550 B2 | 11/2006 | Ramachandran | |
| 7,154,447 B2 | 12/2006 | Copeland et al. | |
| 7,207,477 B1 | 4/2007 | Ramachandran | |
| 7,280,094 B2 | 10/2007 | Albert | |
| 7,304,574 B2 | 12/2007 | Romer et al. | |
| 7,317,426 B2 | 1/2008 | Copeland et al. | |
| 7,344,066 B1 | 3/2008 | Ramachandran | |
| 7,353,988 B1 | 4/2008 | Ramachandran | |
| 7,367,497 B1 | 5/2008 | Hill | |
| 7,392,938 B1 | 7/2008 | Ramachandran | |
| 7,445,155 B2 | 11/2008 | Ramachandran | |
| 7,481,360 B1 | 1/2009 | Ramachandran et al. | |
| 7,490,758 B2 | 2/2009 | Drummond et al. | |
| 7,533,828 B2 | 5/2009 | Ong | |
| 7,537,154 B2 | 5/2009 | Ramachandran | |
| 7,552,869 B1 | 6/2009 | Ramachandran | |
| 2008/0201215 A1 | 8/2008 | Lin | |

FOREIGN PATENT DOCUMENTS

| | | |
|---|---|---|
| EP | 1058147 A3 | 4/2002 |
| JP | 09130999 A2 | 5/1997 |
| WO | WO 94/23381 | 10/1994 |
| WO | WO 95/23389 | 8/1995 |
| WO | WO 97/04398 | 2/1997 |
| WO | WO 98/03896 | 1/1998 |
| WO | WO 98/04953 | 2/1998 |
| WO | WO 98/13804 | 4/1998 |
| WO | WO 98/13805 | 4/1998 |
| WO | WO 98/19208 | 5/1998 |
| WO | WO 98/35243 | 8/1998 |
| WO | WO 98/41898 | 9/1998 |
| WO | WO 98/41899 | 9/1998 |
| WO | WO 99/10769 | 3/1999 |
| WO | WO9934251 A1 | 7/1999 |
| WO | WO 00/16189 | 3/2000 |
| WO | WO 00//26761 | 5/2000 |
| WO | WO 00/36465 | 6/2000 |
| WO | WO 00/36666 | 6/2000 |
| WO | WO 00/46854 | 8/2000 |
| WO | WO 00/49421 | 8/2000 |
| WO | WO 00/49658 | 8/2000 |
| WO | WO 00/52671 | 9/2000 |
| WO | WO 00/55915 | 9/2000 |
| WO | WO 00/55916 | 9/2000 |
| WO | WO 00/67327 | 11/2000 |
| WO | WO0067110 A1 | 11/2000 |
| WO | WO 01/07961 | 2/2001 |
| WO | WO 01/08241 | 2/2001 |
| WO | WO 01/08242 | 2/2001 |
| WO | WO 01/17029 | 3/2001 |
| WO | WO 01/17040 | 3/2001 |
| WO | WO 01/17041 | 3/2001 |
| WO | WO 01/33621 | 5/2001 |
| WO | WO 01/80287 | 10/2001 |

OTHER PUBLICATIONS

Search Report for EP 08 00 9702 completed Aug. 13, 2008.
Chiang, A., et al., "A Stylus Writable Electrophoretic Display Device", SID 79 Digest (1979), 4.
Chiang, A., et al., "A High Speed Electrophoretic Matrix Display", SID 80 Digest (1980), 114.
Comiskey, B., et al., "Electrophoretic Ink: A Printable Display Material", SID 97 Digest (1997), p. 75.
Jacobson, J., et al., "The last book", IBM Systems J., 36, 457 (1997).
Burch, B., "Motorola Envoy Personal Wireless Communicator", Business Wire, Motorola, Inc., Mar. 9, 1994, 5.
Want, R. et al., "An Overview of the ParcTab Ubiquitous Computing Experiment", IEEE, Dec. 1995, p. 28-43.
Jacobson, J. et al., "Surfaces and Displays", WIRED 5.01, Jan. 1997, 2.
Search Report for PCT/US99/20777 completed Dec. 17, 1999.

Search Report for EP 03011665 completed Jul. 3, 2003.
Search Report for EP 02717399 completed Aug. 27, 2008.
Gleskova, Helena et al., "Electrophotographically printed insulator," Materials Letters, vol. 52: 150-153 (2002).
Gleskova, H. et al., "Electrical response of amorphous silicon thin-film transistors under mechanical strain," Journal of Applied Physics, vol. 92(10): 6224-6229 (2002).
Gleskova, H. et al., "Effects of Mechanical Strain on Amorphous Silicon Thin-Film Transistors," Mat. Res. Soc. Symp. Proc., vol. 715: 667-677 (2002).
Hsu, P.I. et al., "Amorphous Si TFTs on plastically deformed spherical domes," Journal of Non-Crystalline Solids, vol. 299-302: 1355-1359 (2002).
Sturm, J.C. et al., "Enabling Technologies for Plastic Displays," SPIE (2002).
Wagner, Sigurd et al., "Silicon Thin-film Transistors on Flexible Foil Substrates," IMID '02 Digest, pp. 263-267 (2002).
Wagner, Sigurd et al., "Thin-film transistors and flexible electronics," Research Signpost, pp. 1-14 (2002).
Wagner, Sigurd et al., "Silicon for thin-film Transistors," $2^{nd}$ International Conference on Cat-CVD (Hot-Wire CVD) Process, pp. 1-6 (2002).
Chen, Y. et al., "A Conformable Electronic Ink Display using a Foil-Based a-Si TFT Array," SID 01 Digest, pp. 157-159 (2001).
Gleskova, H. et al., "a-Si:H TFTs on Polyimide Foil: Electrical Performance Under Mechanical Strain," The $21^{st}$ International Display Research Conference in conjunction with the $8^{th}$ International Display Workshops, pp. 331-335 (2001).
Gleskova, H. et al., "Low-Temperature silicon nitride for thin-film electronics on ployimide foil substrates," Applied Surface Science, vol. 175-176: 12-16 (2001).
Gleskova, H. et al., "Electrical Stability of a-Si:H TFTs Fabricated at 150° C," Mat. Res. Soc. Symp. Proc., vol. 664 (2001).
Gleskova, H. et al., "150° C Amorphous Silicon Thin-Film Transistor Technology for Polyimide Substrates," Journal of the Electrochemical Society, vol. 148(7): G370-G374 (2001).
Gleskova, Helena et al., "DC-Gate-Bias Stressing of a-Si:H TFTs Fabricated at 150° C on Polyimide Foil," IEEE Transactions on Electron Devices, vol. 48(8): 1667-1671 (2001).
Gleskova, H. et al., "Electron mobility in amorphous silicon thin-film transistors under compressive strain," Applied Physicals Letters, vol. 79(20): 3347-3349 (2001).
Sturm, J.C. et al., "Three-Dimensional Electronic Surfaces," Mat. Res. Soc. Symp. Proc., vol. 636 (2001).
Forbes, C.E. et al., "A Rugged Conformable Backplane Fabricated with an a-Si:H TFT Array on a Polyimide Substrate," SID 02 Digest, pp. 1-4 (2000).
Gleskova, H. et al., "a-Si:H thin film transistors after very high strain," Journal of Non-Crystalline Solids, vol. 266-269: 1320-1324 (2000).
Wagner, Sigurd et al., "Low Temperature Amorphous and Nanocrystalline Silicon Technology for Flat Panel Displays," International Display Research Conference, pp. 402-405 (2000).

Wagner, Sigurd et al., "Novel Processing Technology for Macroelectronics," Technology and Applications of Amorphous Silicon, Springer-Verlag publisher, pp. 222-251 (2000).
Zonov, Andrei et al., "Fabrication of a-Si:H TFTs at 120° C on Flexible Polyimide Substrates," Mat. Res. Soc. Symp. Proc., vol. 558: 375-381 (2000).
Baeuerle, R. et al., "A MIM-Driven Transmission Display with Color Filters on 2-in.-Diagonal Plastic Substrates," SID 99 Digest, vol. 14 (1999).
Gleskova, H. et al., "Rugged a-Si:H TFTs on Plastic Substrates," Mat. Res. Soc. Symp. Proc., vol. 557: 653-358 (1999).
Gleskova, H. et al., "Amorphous Silicon Thin-Film Transistors on Compliant Polyimide Foil Substrates," IEEE Electron Device Letters. vol. 20(9): 473-475 (1999).
Gleskova, H. et al., "Failure resistance of amorphous silicon transistors under extreme in-plane strain," Applied Physics Letters, vol. 75(19): 3011-3013 (1999).
Suo, Z. et al., "Mechanics of rollable and foldable film-on-foil electronics," Applied Physics Letters, vol. 74(8): 1177-1179 (1999).
Wagner, Sigurd et al., "Compliant substrates for thin-film transistor backplanes," Proceedings of the SPIE, vol. 3636: 32-39 (1999).
Comiskey, Barrett et al., "An electrophoretic ink for all-printed reflective electronic displays," Nature, vol. 394: 253-255 (1998).
Gleskova, H. et al., "a-Si:H TFTs Made on Polyimide Foil by PE-CVD at 150° C," Mat. Res. Soc. Symp. Proc., vol. 508:73-78 (1998).
Gleskova, H. et al., "Photoresist-free fabrication process for a-Si:H thin film transistors," Journal of Nokrymolids, vol. 227-230:1217-1220 (1998).
Theiss, S.D. et al., "PolySilicon Thin Film Transistors Fabricated at 100° C on a Flexible Plastic Substrate," IEEE (1998).
Thomasson, D.J.B. et al., "Tri-Kyer a-Si:H TFTs on Polymeric Substrates," pp. 126-127 (1998).
Gleskova, H. et al., "a-Si:H TFTs Patterned Using Laser-Printed Toner," Mat. Res. Soc. Symp. Proc., vol. 424:71-76 (1997).
Negroponte, Nicholas, "Surface and Displays", Wired issue No. 3.01, Jan. 1, 1997. 3 pages.
Gleskova, H. et al., "Electrophotographically Patterned Thin-Film Silicon Transistors," IEEE Electron Device Letters, vol. 17(6):264-266 (1996).
Gleskova, H. et al., "a-Si:H TFT Fabricated by Electrophotographic Printing," Display Manufacturing Technology Conference, pp. 97-98 (1996).
Gleskova, H. et al., "Electrophotographic Patterning of a-Si:H," Mat. Res. Soc. Symp. Proc., vol. 377:719-724 (1995).
Gleskova, H. et al., "Electrophotographic Patterning of Thin-Film Silicon on Glass Foil," IEEE Electron Device Letters, vol. 16(10): 418-420 (1995).
Gleskova, H. et al., "Electrophotographic Patterning of a-SiH," ALMCDs '95 Workshop Proceedings, pp. 16-19 (1995).
Shen, D.S. et al., "Patterning of a-Si:H by Laser Printing," SID 95 Digest, pp. 587-590 (1995).

REMOTELY-ALTERABLE ELECTRONIC-INK BASED DISPLAY DEVICE EMPLOYING AN ELECTRONIC-INK LAYER INTEGRATED WITHIN A STACKED ARCHITECTURE

RELATED APPLICATIONS

This application is a continuation of U.S. application Ser. No. 11/196,776 filed Aug. 2, 2005, now abandoned; which is a continuation of U.S. application Ser. No. 09/393,553 filed Sep. 10, 1999, now U.S. Pat. No. 6,924,781; which claims priority to provisional patent application Ser. No. 60/099,888, filed Sep. 11, 1998; each Application being owned by Metrologic Instruments, Inc. and incorporated herein by reference.

BACKGROUND OF THE INVENTION

The present invention is directed to electronic display devices, and is more particularly directed to remotely updateable electronic label devices and systems for displaying selected data.

Conventional printing labels and methodology for affixing them to particular items are well known in the art. The information permanently applied on the printing labels reflects information known about the particular items at the time the labels were created. It is generally difficult to alter the indicia on the printing labels once created for the particular items. In general, three conventional techniques have been developed to address this problem. According to a first technique, a completely new label is created to replace the previously printed label. The new label is typically reaffixed to the particular item, either at a new location or over the existing label. According to a second technique, a new but smaller label can be employed to patch over a portion of the originally printed label in order to alter particular indicia related to the item. In some applications, properly placing and aligning the new, smaller label, so that it can subsequently be read by a machine or person, is a difficult, labor intensive, and error prone process. In the situation where all or a portion of a label is changed with the new label, great care is taken to ensure that an unacceptable buildup of labeling material does not occur, and that the label alignment is sufficient to illustrate the altered item indicia, as well as to ensure that it does not affect human or machine readable processes.

A third common technique involves the situation where the information or image is directly imprinted or manually written or drawn onto an item. In this circumstance, the old image is generally removed or erased, and then a new image is reprinted or drawn on the item. Examples of such information deleting include price changes related to the item, changes in menu prices, the return dates on library books, return dates for video rentals, and the like. Great care is typically employed to ensure that the integrity of the information visible on the new label or the designated area is not adversely impacted through some interaction or interference with the information previously imprinted or present on the label or disposed in the designated area. Otherwise, the integrity of the new item information may be affected. Moreover, removing or erasing the original information imprinted, written, or drawn on the label or designated area of the item may result in damage to the item.

Conventional items to be labeled generally reserve a designated location for displaying relevant item information. Generally, an individual applies the labels to the item at this designated location, or writes, draws or stamps information in the designated area. Despite the presence of the designated label location, it is typical to find variability between items in terms of the label location, orientation and ability to convey the proper information to a consumer or to a piece of equipment intended to read automatically the information off the item.

There accordingly exists a need in the art for a stand-alone, remotely updateable and/or alterable electronic label which can be formed in various sizes and shapes for displaying information related to an item in human or machine readable form. There further exists a need in the art to update or alter the information related to the item in a manner which allows the label to be reused a significant number of times.

SUMMARY OF THE INVENTION

It is an object of the present invention to provide a smart, flexible electronic display, label, tag or strip that is self contained, does not require an onboard power source (such as a battery), and employs radio wave transmissions to remotely update and permanently or temporarily alter the information displayed in human and/or machine readable form. The information displayed by the label can be a subset of the information locally stored on the label, information received partly or solely from an external source, or a combination thereof. Moreover, the label can be a 'dumb' label by displaying solely the information received from the external source, or can be a 'smart' label capable of determining in whole or in part the information to be displayed.

It is a further object of the present invention to employ the electronic label of the present invention in a number of different applications to create 'display, label, tag, or strip systems' that include combinations and variations of microprocessors, computer(s), software, electromagnetic transmitters and receivers, and a variety of antennas, etc., that can communicate with and update the remotely updateable/alterable electronic label, tag or strip in any manner.

It is a further object of the present invention to provide an electronic label for updating information on a display portion of the label, tag or strip. The label can be formed as a wristband, pendant, badge, pin, etc., and worn by a person in a place of entertainment or amusement, or in any other environment or venue where it is beneficial to periodically update the information displayed on the label to reflect both the status of services or events of interest.

The present invention provides for smart and dumb implementations of a stand-alone, remotely updateable, remotely alterable, flexible electronic display, label, tag or strip device of various sizes and shapes. The number of layers forming the device can vary depending upon the particular components employed in the device, and upon the requirements or exigencies of the intended application. The display device of the present invention provides a flexible electronic display that is self contained, does not require an onboard power source, and employs radio wave transmissions to remotely update and permanently alter information displayed in human and/or machine readable form. The electronic display device of the present invention can be provided in various embodiments, each of which can be employed as a system for displaying information related to a particular item. Each electronic display system can include combinations and variations of particular electronic components, including microprocessors, computer software, transmitters, receivers, and a variety of antennas, etc., that can communicate with and remotely update the electronic display at various distances. According to one practice, the display device can be updated by providing for an electronic hard wire connection to an information altering device, or by employing electromagnetic waves to alter the display from various distances.

The present invention provides for smart and dumb implementations of a stand-alone, remotely updateable, remotely alterable, flexible electronic label. The electronic label provides for displaying information in connection with a mammal, non-mammal, an item or location. The label includes a display assembly having electronic ink disposed on a support, one or more antennas for sending or receiving signals corresponding to one of instructions, programs, data or selected indicia to be displayed by said display assembly, a storage element in circuit with the antenna for storing the instructions, programs, data and indicia, and one or more processors for intelligently determining the indicia to be displayed by the display assembly, for controlling and coordinating operation of the label, and for generating output signals for instructing the display assembly to display the indicia.

The present invention also provides for a stacked, layered electronic label suitable for displaying information. The label includes one or more display layers having electronic ink disposed on a support, one or more activation grid layers for activating said electronic ink or other display layers, one or more antenna layers for sending or receiving signals corresponding to programs, instructions, data or indicia to be displayed by said display assembly, and a processor layer including one or more processors and a storage element. The storage element stores indicia, data, programs or instructions. The processor, which is in circuit with the display layer, the activation layer, and the antenna layer, determines intelligently the indicia to be displayed by the display layer. The processor also controls and coordinates operation of the label, and generates output signals for instructing the display layer to display the indicia. The display layer, said antenna layer, said activation grid layer, and said processor layer are all stacked together to form the stacked electronic label.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATIVE EMBODIMENTS

Figure 1:
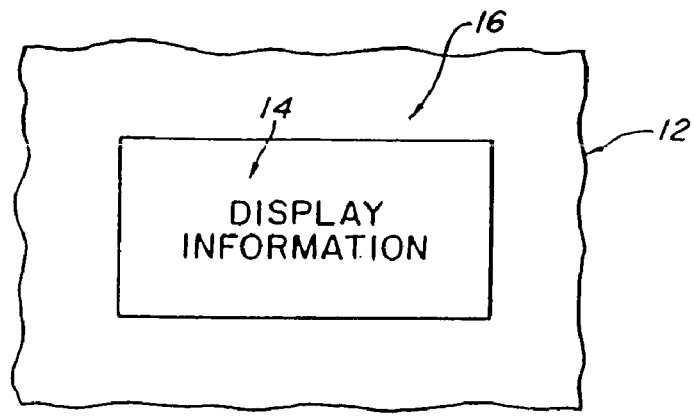
FIG. 1 is a perspective view of the electronic label according to the teachings of the present invention employed in connection with an item.

FIG. 1 is a broad illustration of an electronic label employed in connection with an item, person, animal or location in accordance with the teachings of the present invention. The illustrated electronic label 16 is specifically employed in connection with an item 12. The electronic label 16 displays information, generally as human or machine readable indicia 14, in order to display information related to the item 12 or any other predefined or selected information. The electronic label 16 can be temporarily or permanently affixed, attached, secured or coupled to the item 12 according to known methods and techniques. According to one practice, a suitable conventional mechanical fastening system, such as fasteners, loop and hook-type arrangements, stitches, adhesives, and molding, as well as other known fixation techniques, can be employed to permanently or temporarily attach the electronic label 16 to the item 12. The label can also be integrally formed with the item, or can be used as a stand alone label. As used herein, the term "label" is intended to include a label, strip, tag or general display device that is sufficiently sized and configured for attachment to an animal, person, item, or location for displaying indicia. For purposes of clarity, the electronic label 16 is generally shown and described as being attached to an item, although those of ordinary skill will readily recognize that the label can also be attached to an animal, person or location.

The illustrated electronic label 16 displays information that is either wholly or partly prestored or preloaded, or uploaded, in the label, or created by a processor in the label, or displays information that corresponds or is consistent with or based upon signals received from an external source, such as an activator module and/or a GPS system. Those of ordinary skill will readily recognize that the information displayed by the electronic label 16 can be any general information corresponding to the item, location, mammal or non-mammal, and which is suitable and appropriate for a particular intended use.

Figure 2:
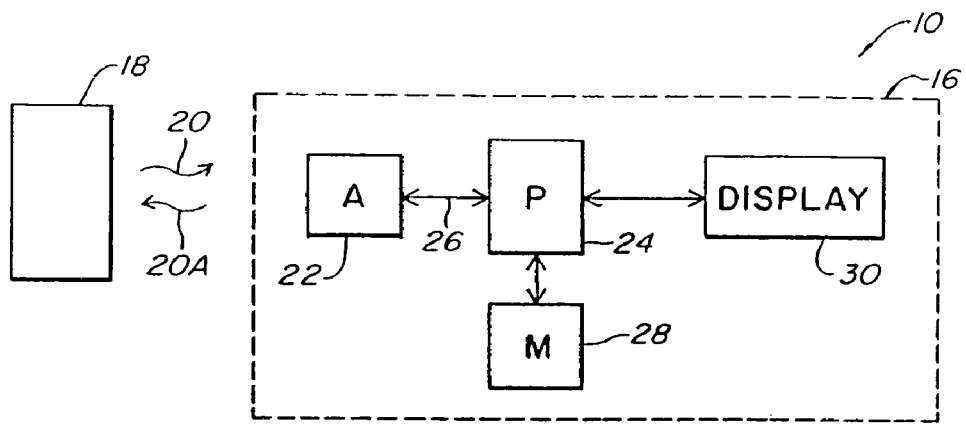
FIG. 2 is a schematic depiction of the electronic label (with selected electronic components illustrated) and activator module that form the electronic label system according to the teachings of the present invention.
Figure 6:
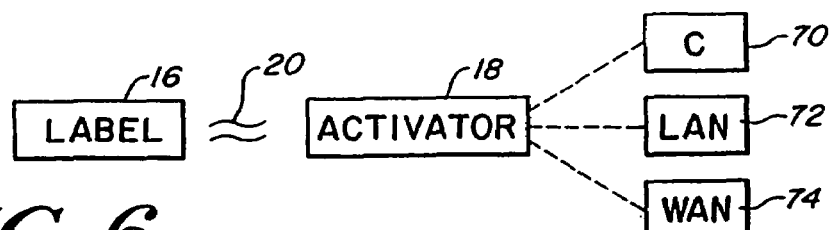
FIG. 6 is a schematic depiction of the electronic label system of FIG. 2 connected to one or more remote devices or systems according to the teachings of the present invention.

FIG. 2 is a schematic depiction of the electronic label 16 used in connection with an activator module 18. The activator module, when used in connection with the electronic label 16, can function as a master controller, by sending signals to the electronic label so as to actuate the label to display particular indicia, or by receiving selected signals from the electronic label for subsequent use. The signals received by the activator module 18 can be representative of a variety of information, including the status of the indicia displayed by the electronic label 16, as well as any other information suitable to be employed by the activator, and which would be obvious to those of ordinary skill in the art. The illustrated activator module 18 can be a pocket-sized, handheld, portable, or fixed location signal generating device, which can employ or be formed as a suitable antenna. The illustrated activator module can be coupled to any appropriate processing or control apparatus, such as a stand-alone computer 70, a local area network (LAN) 72, wide area network (WAN) 74, internet, intelligent appliance, or any other suitable signal generating, processing or control apparatus known to those of ordinary skill in the art. This arrangement is illustrated in FIG. 6. The activator module 18 can be coupled to the processing or control apparatus through any suitable communication link, such as a standard electrical cable, optical fiber, wireless network or any suitable direct or indirect connection or link. The applications and embodiments described below generally employ radio signals. The processing and signal control capabilities of the activator module 18 can be housed completely within the activator module, or can be distributed among the system or devices to which it is connected.

With reference again to FIG. 2, the activator module 18 generates an output signal, designated as radio wave signal 20, that is received by the electronic label 16. Those of ordinary skill will readily recognize that the activator module 18 can generate any suitable output signal 20 at any suitable selected frequency. Consequently, the activator module 18 can operate as a number of different types of signal radiators depending upon the label's intended use. The module can operate over sequential frequencies or can use simultaneously a number or combination of different frequencies. FIG. 2 illustrates at least some of the selected mechanical and electrical components that comprise the electronic label 16 of the present invention. The radio wave signal 20 generated by the activator module 18 is received by an antenna element 22. The antenna element 22, in response to the signal 20, generates an output antenna 26 that is received by a processor 24. The activator module 18 preferably generates an output signal 20 at a frequency that corresponds to the antenna element 22. Those of ordinary skill will readily recognize that the activator module 18 can generate an output signal at any selected frequency, and hence can provide any suitable antenna element 22 configured for receiving the activator output signal. The illustrated processor 24 processes the antenna output signal 26 to perform one of a selected number of functions. For example, the processor 24 can communicate with a storage element 28 in order to store new information or data, or to access or retrieve selected information or data stored therein, such as computer programs or instructions or stored pixel addresses, which can be employed to determine the particular indicia displayed by the display. The storage element 28 can also store a unique label or tag identification number, product code, color, name, size, description, cost, sale price, percent reduction/markdown, unit of sale, lot number, expiration date, manufacturing date, manufacturer, identifier of manufacturing plant, country of origin, countries through which item has passed, tax rate, taxes paid, last price change, stocking number reorder number, retail store name and location, destination, intended use, cooking instructions, useful life based on storage temperature, recipes, last time cleaned or used, when item was initially opened, encrypting software, and security and anti-counterfeit software, as well as other related data consistent with the intended use of the label. Those of ordinary skill will be readily able to determine in light of the teachings herein the information to be stored in the label 16 or transmitted to the label 16.

According to one practice, the processor 24 and the storage element 28 operate in conjunction with each other to retrieve stored data corresponding to indicia to be displayed by the display assembly 30. According to another practice, the processor 24 can initiate or execute one or more preprogrammed sequences stored locally within the storage element 28 for determining which indicia is displayed by the display element 30. Alternatively, the processor 24 can process instructions received by the activator module 18. Hence, the processor can be employed to control and coordinate the display, while concomitantly processing or passing along instructions received from the activator module or stored on the label. The processor 24 can also generate output signals to activate the display to show selected indicia based on executed instructions employing information stored locally in the label (e.g., in the storage element 28), information generated locally in the label, information received from the activation module or from some other source (e.g., a GPS system), or information generated from a combination thereof. The processor 24 can further be configured to employ a combination of locally stored or generated instructions and externally received instructions to determine a subset of the locally stored information transmitted by the external source (e.g., activator module 18) that should be displayed. This information can then be used to determine the appropriate set of information processed by the processor 24. The processor 24 can generate an output signal that activates the display assembly 30 to display selected human and/or machine readable indicia in any format. The indicia displayed by the display assembly 30 can be information (e.g., textual or graphic information) associated or related to a mammal, non-mammal, item, or geographic location, or any other suitable indicia consistent and compatible with the label's intended use. The information can be displayed by the display assembly 30 in any appropriate font color, font type, font size or format, including any appropriate pixel density, and display duration, such as flashing, non-flashing, static, motion, 3D, and the like. Moreover, the display can be adjusted or altered to display selected amounts of information in any suitable format. The processor 24 can also employ encrypting and security software or programs stored in the storage element 28 to authenticate commands received or executed by the label. This function affords a selected level of security and anti-counterfeit protection by ensuring that only authorized information is displayed by the label. The storage element 28 can be any suitable volatile or non-volatile memory element, or combinations thereof, such as RAM, ROM, EPROM, EEPROM, or any other suitable memory or storage element known to those of ordinary skill. Those of ordinary skill will also recognize that the processing instructions can be hardwired in the label 16 using discrete components and that all or portions of the processor functions can be constructed using discrete components.

The illustrated processor 24 can operate to activate the display assembly 30 to display a selected series of indicia. The processor 24 can also be configured to maintain the indicia displayed by the display assembly for a selected, finite period of time according to preselected programs stored in the label. Alternatively, the processor 24 can alter in a periodic, nonperiodic, intermittent or other selected manner the indicia displayed by the display assembly.

The illustrated electronic label 16 can further be adapted to transmit a signal 20A from the label 16 to the activator module 18. The signal 20A transmitted by the electronic label 16 can include information or data associated with the status of the indicia displayed by the display assembly 30, the status or operating condition of the electronic label, or any other information suitable for use by the activator module 18 and the system to which the activator module 18 is connected.

The illustrated electronic label 16 can have a size suitable for its intended use. In particular, the label 16 can be sized and dimensioned to form a label for use on a container, article of clothing, luggage, keyboard, gameboard, menu, and other articles, and can also be constructed as a wristband, pennant, or any other suitable element used in connection with an item, person or location for displaying selected information. The intended use and application of the electronic label dictate the size and shape of the label. Those of ordinary skill will thus recognize that the illustrated electronic label 16 functions as an electronic, scalable, alterable display unit for use in connection with a mammal, non-mammal, selected item, or location.

Figure 3:
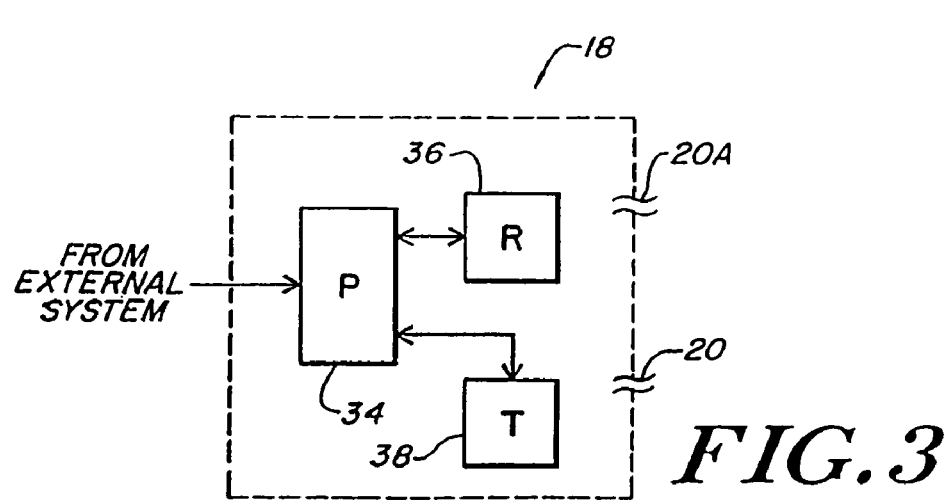
FIG. 3 is a more detailed schematic depiction of the activator module of FIG. 2 with selected electrical components illustrated.

FIG. 3 is a schematic illustration of some of the electrical components which can be housed within the activator module 18 of the electronic label system 10 of the present invention. The activator module 18 can employ a processor 34 that is adapted to be used in connection with a receiver 36, a transmitter 38, or any other appropriate antenna device. Those of ordinary skill will readily recognize that the receiver 36 and the transmitter 38 can be combined into a single transceiver device for both sending and receiving signals. The illustrated receiver 36 is configured for receiving the output signal 20A generated by the electronic label 16. Conversely, the transmitter 38 operates in connection with the processor 34 to transmit the output signal 20 that is received by the antenna 22 housed within the electronic label 16. The activator module 18 can be configured to send or receive commands, instructions, software programs, and parameters or variables associated with the pixel address locations of the display, the indicia displayed by the label, or instructions for use by the label at a later time, as well as instructions for other functions associated with the operation of the label as both a 'smart' and 'dumb' label.

The activator module 18 can have any suitable shape and size consistent with its intended use and installation. For example, the activator module 18 can be a stand alone device separate from the label 16, or can be connected, secured, affixed or integrally formed with an item that also is coupled or in communication with the label or with a device normally used in connection with the item. The activator module 18 can be formed as a portable or hand-held device, or can be of relatively large size and fixed temporarily or permanently at a selected location. Additionally, more than one activator module can be employed in connection with a single label, and systems can be created that employ various numbers of activator modules 18 and labels 16. Multiple activators of a single style or variety can be intelligently coupled or networked together to provide more complex and sophisticated use.

The processor 34 can be a stand-alone processor or controller used in connection with the activator module 18. According to an alternate embodiment, the processor 34 can be configured to communicate with one or more remote devices or controllers, such as the stand-alone computer 70, a wired or radio frequency based LAN 72, or a wired or radio frequency based WAN 74, as illustrated in FIG. 6. Other remote devices not illustrated but which can also be coupled to the activator module include telephones, cable televisions, digital and analog cellular phone networks, satellite networks, private, public, military and government control and communication systems, internet, world wide web, intranets, Intelligent Appliances, GPS systems, and radios including AM and FM radios broadcasting at various frequencies. The illustrated remote devices 70-74 can operate in connection with the activator module 18 to form a control and processing system for use with the electronic label 16. The remote devices can store selected algorithms or programs for processing selected data or instructions received by the activator module from the label 16. Alternatively, the remote devices can program or instruct the activator module 18 to perform selected functions, such as instruct the label to display certain indicia, prestored or not, at a certain time, for a certain duration etc., or for altering the indicia displayed by the label. Those of ordinary skill will readily recognize that the activator module 18 and the remote devices can operate in any selected manner, such as a distributed processing system, for controlling the electronic label 16.

Figure 4:
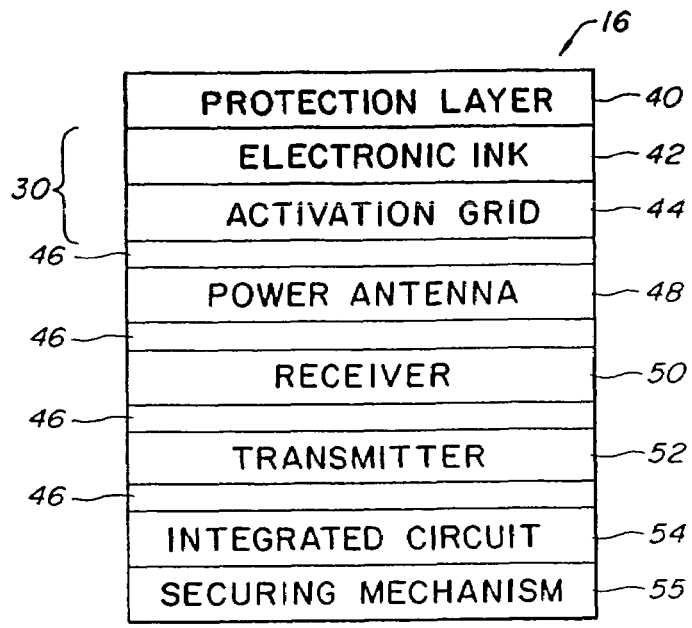
FIG. 4 is a schematic view illustrating the stacked and assembled layers of one embodiment of the electronic label of FIG. 1 according to the teachings of the present invention.

The electronic label 16 of the present invention can be constructed in a variety of different manners for receiving signals from the activator module 18, for processing signals, and for activating a display assembly for displaying selected indicia. According to one embodiment, the electronic label 16 can be formed as a stacked, layered electrical and mechanical structure that employs a number of layers, each layer of which is adapted to perform a selected function, and which can be integrated together to form a single operable electronic label. Those of ordinary skill will also recognize that the label 16 can employ a single layer. With reference to FIG. 4, a protection layer 40 can be disposed over a layer of electronic ink 42 in order to prevent the electronic ink (or display assembly 30) from inadvertent physical trauma and/or environmental damage. The electronic ink layer 42 can be formed or constructed of multiple layers of material, but for purposes of illustration and clarity it is illustrated as a single layer. The electronic ink 42 is employed with an electronic activation grid 44, disposed on a support structure, to form the display assembly 30. The illustrated activation grid can be constructed of one or more layers of material and operated to form a plurality of addressable pixel locations. Each pixel can be addressable by the processor 24, and can be contained or formed within the integrated circuit layer 54. The processor 24 can control, address, alter or change each pixel location in the activation grid 44. The activation grid 44 is intended to be employed in connection with the electronic ink layer 42 to form human and/or machine readable indicia. The activation grid 44 can be formed in a variety of manners and can have a variety of shapes and electronic configurations. The activation grid can alternatively be constructed by including a transparent electrode layer located above or on top of the electronic ink layer. The activation grid 44 can be patterned so as to provide sufficient power (e.g., current or voltage) at selected pixel addresses to form indicia. Such patterns include quadrilateral shape matrices (e.g., square or rectangular XY matrices), intersecting arcs, and linear and non-linear patterns, as well as other designs. The activation grid 44 can also be formed in a manner that reduces the number of necessary current carrying pathways.

The electronic ink layer 42 can employ electronic ink disposed on a suitable support structure, such as on or between one or more electrodes. The term "electronic ink" as used herein is intended to include a printable, conductive ink having an arrangement of particles or microscopic containers or microcapsules. Each microcapsule has disposed therein an electrophoretic composition of a fluid, such as a dielectric or emulsion fluid, and a suspension of colored or charged particles or colloidal material. According to one practice, the particles visually contrast with the dielectric fluid. According to another example, the electronic ink can include rotatable balls that can rotate to expose a different colored surface area, and which can migrate between a forward viewing position and/or a rear non-viewing position. Electrodes can be used in conjunction with the electronic ink to form an electronically activatable and addressable display assembly. The electrodes can be disposed on and/or cover opposite sides of the microcapsule arrangement to provide structure for creating a potential difference across the electronic ink that causes particles within the microcapsules to migrate toward one of the electrodes. This migration can change the color of the sphere, and hence the pixel location, as viewed by an individual. According to one practice, the microcapsules can be filled with electrically charged white particles in a black or colored dye.

Examples of electronic ink and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference. The electronic ink employed by the label 16 of the present invention can also be configured as a single color, such as black, white or clear, and can be fluorescent, iridescent, bioluminescent, incandescent, ultraviolet, infrared, or can include a wavelength specific radiation absorbing or emitting material. There can be multiple layers of electronic ink, each with its own activation grid layer, or multiple ink layers can be serviced by more than one activation grid layer. Different layers of electronic ink can have different properties or colors. Creating different layers for each primary color enables color displays, in a fashion similar to the operation of a conventional television. Any combination of electronic ink layers and activation grid layers are represented for illustration and discussion purposes as display assembly 30. Moreover, the characteristics of the various layers can be different from each other. For example, one layer can be used to view or display information in the visible light range, while a second layer responds to or emits ultraviolet light. The non-visible layers can alternatively be constructed of non-electronic ink based materials that have the previously listed radiation absorbing or emitting characteristics. The electronic ink employed in connection with the present invention preferably has the characteristic that it does not require power to maintain display of indicia. The support layer suitable for use in connection with the electronic ink and the activation grid layer 44 can be formed of any suitable material compatible with the electronic ink, and include Mylar, Kapton, lignocellulosic material, plastic, non-conducting polymers, and the like.

The processor 24 can hence selectively activate an addressable pixel location on the activation grid to charge the electrodes, and hence the particles within the microcapsules. The particles in the microcapsule can be transferred between end locations (or between electrodes) in order to display either a white or dark spot. The combination of white and dark spots, which correspond to pixel locations, can be patterned to create text and images. Hence, the display assembly 30 in connection with the processor 24 can operate to change the state of the particles within the microcapsules depending upon the applied voltage. The voltage or current can be applied to the activation grid 44 according to known addressing techniques.

With reference to FIGS. 2 and 4, the electronic label 16 can employ an onboard power device, such as a battery, or a combination of off-board and on-board power sources for powering one or more of the label components or layers. The illustrated label 16 is preferably free of any such onboard power generating source, and employs a power antenna for receiving power signals from an external source, such as from the activator module 18. The power antenna can be formed as a power antenna layer 48 disposed between two shielding layers 46 in order to electromagnetically isolate the antenna from one or more of the other label components. Those of ordinary skill will recognize that any number and arrangement of shielding layers can be used. Those of ordinary skill will also recognize that the activator module 18 can transmit an appropriate power signal at a selected frequency compatible with the power antenna 48 to the label 16 to provide power thereto. The electronic label 16 of the present invention can thus employ power exclusively or solely from an on-board power source, such as from a power storage element (e.g., battery, capacitor, solar cell, micro-mechanical generator, etc.), solely or exclusively from power received from an external source, or from a combination of on-board and off-board sources.

The electronic label 16 can function as a stand-alone, integrated, and substantially complete electronic label that need not communicate with an external controller for power, such as the activator module 18, or can be selectively configured to receive power from an external source. According to an alternate embodiment, a receiver, transmitter, or combined transceiver, or any combination thereof, can also be formed as layers in the stacked, layered electronic label 16. For example, a receiver layer 50 can be employed in the electronic label 16. The receiver layer 50 can be configured to receive signals, such as signals 20, from the activator module 18 at a selected frequency. Furthermore, the transmitter layer 52 can be adapted to transmit selected signals, such as signals 20A, from the electronic label 16 to the activator module 18 at a selected frequency. The activator module 18 can be configured to transmit commands, instructions, software programs, and parameters or variables associated with the pixel address locations of the display, the indicia displayed by the label, or instructions for use by the label at a later time, as well as instructions for other functions associated with the operation of the label. The illustrated receiver layer 50 and the transmitter layer 52 can be electromagnetically isolated from the power antenna 48 by shielding layers 46. Those of ordinary skill will recognize that the power antenna 48, receiver 50, and transmitter 52 are optional components of the electronic label 16. Those of ordinary skill will also recognize that any number of suitable antennas can be employed in connection with the label 16 of the present invention. For example, the label 16 can employ a common antenna layer to perform all necessary functions, a discrete antenna for each function, or any subset of antennas for performing one or more functions.

The illustrated electronic label 16 can further employ an integrated circuit layer 54 that includes one or more other electrical components of the electronic label 16. The illustrated integrated circuit 54 is preferably electrically coupled or disposed in electrical communication with one or more layers of the electronic label 16, such as the activation grid layer 44, the power antenna layer 48, the receiver layer 50, and the transmitter layer 52. Moreover, the integrated circuit layer can function as an electronic catch-all layer for providing numerous electrical components employed by the label 16.

Figure 5:
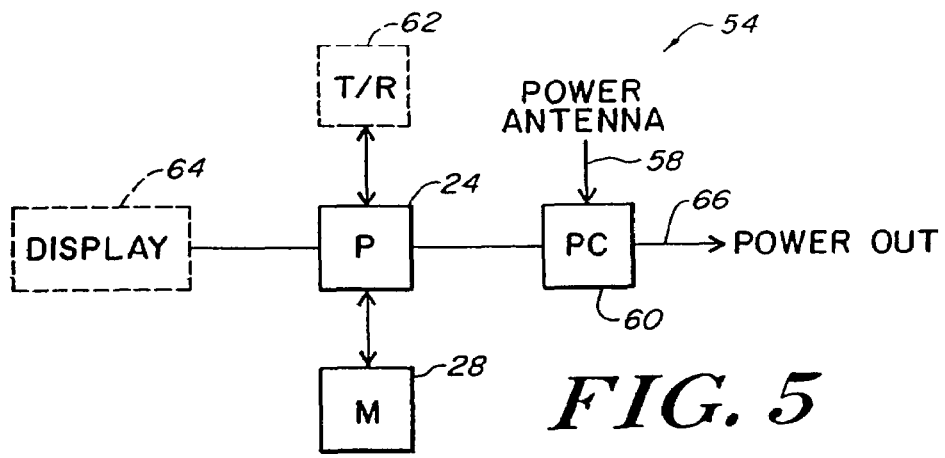
FIG. 5 is a general schematic depiction of certain selected electrical components employed by the electronic label of FIG. 1 according to the teachings of the present invention.

FIG. 5 is a broad schematic illustration of the integrated circuit layer 54 employed in connection with the electronic label 16 of the present invention. The integrated circuit 54 can include the processor 24 and the storage element 28 discussed above in connection with FIG. 2. The integrated circuit layer 54 can also employ a power converter 60 that is coupled to the processor 24, and is adapted to receive power signals 58 generated by the power antenna in response to power signals received from the activator module 18. The power converter 60 converts the power antenna signals 58 into suitable output current or voltage signals for use by the components of the electronic label 16. The illustrated integrated circuit layer 54 can further employ a transmitter, a receiver, a transceiver, or a combination thereof, as well as a secondary display 64, or any other suitable layered or discrete electrical component.

Those of ordinary skill will readily recognize that in order to alter or change the information displayed by the display assembly 30 of the electronic label 16, the activator module 18 transmits data in low powered and/or high frequency radio signals to the antenna element 22, where it is converted into binary information by the processor 24. Further, different power levels and different frequencies can be used to transfer power and/or data between the activator module and the label. The information or data received by the electronic label 16 from the activator module 18 can include programs or algorithms, or new information, that can be employed by the label 16 in order to update, change, alter, or maintain indicia displayed by the display assembly 30, or pixel addresses corresponding to pixel locations in the display.

The information shown on the display assembly 30 can be, according to one embodiment, a subset of the information stored within the storage element 28, or derived or calculated from information or data stored in the storage element 28. Moreover, the activator module 18 can be employed in connection with one or more additional processing or control apparatus to instruct or activate the electronic label 16.

The layers of the electronic label 16 can be formed of any suitable material in order to form a malleable, flexible or inflexible label. According to one embodiment, one or more of the layers can be formed of plastic, Mylar, Kapton, pulp-based or PET-based material, or other materials suitable for employing or supporting electronic ink. Examples of additional materials suitable for use in connection with the present invention include metals, non-metals, ceramic, pulp-base products, such as paper, cardboard, and cloth, as well as combinations of various materials. Those of ordinary skill will also recognize that each layer of the electronic label 16 can be formed of different materials, and that the support layers for the electronic ink or one or more of the other layers can be opaque, translucent, colored, flexible, rigid, twistable or bendable. Moreover, the different components of the label 16, such as the display, processor, memory, antennas, power converters, and other components, can be distributed in different layers or locations, or can be co-located or intermingled in different ways in the label and throughout the layers. Although the illustrated label 16 is shown with a certain ordered series of layers, the layers can be distributed differently throughout the stacked label 16. The functionality or fabrication of layers of the label 16 as described herein can also be combined to reduce the number of layers or separated to maintain or increase the number of layers.

A significant advantage of the electronic label 16 of the present invention is that it is a remotely updateable, remotely alterable, flexible electronic display device that can be formed as part of an item, or it can be used in connection with an item to display selected information. Another advantage of the electronic label 16 of the present invention is that it need not employ a power source, or require power to maintain a display of selected indicia on the display assembly 30. Specifically, the indicia formed by the electronic ink does not require power to maintain the selected indicia. Hence, if the activator module 18 interrupts or ceases to transmit power signals to the electronic label 16, the label can still maintain the displaced indicia in human and/or machine readable form.

Another significant advantage of the invention is that the label can be employed as a smart label for processing signals received from an external source and for executing instructions stored in the label, and for determining the indicia to be displayed. Alternatively, the label of the present invention can be employed as a dumb label for processing specific instructions (e.g., pixel addresses) received from the external source. The electronic label can also be employed as a re-useable or disposable label depending upon the intended use.

Another significant advantage of the present invention is that the activator module 18 can be formed in any desired shape, or mounted or disposed at any desired location. Hence, the use of the activator module 18 in conjunction with the electronic label 16 forms an unobtrusive, seamless electronic labeling system that can alter or maintain indicia displayed in connection with an item, location, or individual.

With further reference to FIG. 4, the integrated circuit layer 54 can be constructed so as to provide direct or indirect electrical contacts between the integrated circuit layer 54 and one or more of the other layers 40-52 of the electronic label 16. Those of ordinary skill will readily recognize that the circuitry employed to create the current fields or voltages necessary to cause the physical changes in the electronic ink in the electronic ink layer 42 can be formed as part of the integrated circuit layer 54. Those of ordinary skill will also recognize that other embodiments of the integrated circuit layer 54 exist which can employ discrete components suitable for performing selected functions of the electronic label 16, and which can be mounted in layers other than the integrated circuit layer 54.

Moreover, the activation grid layer 44 of the electronic label 16 can employ circuitry for addressing one or more selected pixel locations within the matrix. For example, the activation grid can employ a modified X,Y style pixel addressable electronic circuitry, or angle radius pixel addressable electronic circuitry, both of which are known and well characterized in the art. Those of ordinary skill will readily recognize that the activation grid can be formed in single or multiple layers, although a single layer is illustrated for purposes of clarity in the electronic label 16 of FIG. 4.

The label 16 can also include a securing mechanism for securing the label to an item, location, or any other suitable support. The securing mechanism is generally schematically illustrated as securing layer 55, and can have any suitable size, shape and configuration. Specifically, the label 16 can be secured to an item or at a location according to many known mechanical and non-mechanical fastening techniques, which are intended to be generally represented by the securing layer 55. The securing layer can be an adhesive backing or a suitable adhesive, or can generally represent securing the label to an item or support by fasteners, stitching, weaving, sewing, laminating, snapping, pinning, tacking, loop and hook-type arrangements, and clipping and the like. The label can be self standing or generally mechanically supported. The securing layer can also be temporarily or permanently attached to the item, or formed partly or wholly from the item or label. For example, the securing layer 55 can be used to form part of a shelf tag, hanging tag, or anti-theft label (electronic label surveillance). According to another practice, the label can be integrally formed with the item or location, or formed from or is the same raw stock or material of the item, and hence need not employ the securing layer 55.

The various layers of label 16 can be physically secured together in a number of different ways, including by traditional mechanical fastening and/or bonding techniques.

In operation, the activator module 18 can be mounted or fixed at a selected location relative to the electronic label 16 to promote communication therebetween. The activator module 18 can be a fixed, stand-alone device that includes all necessary control and processing circuitry. In an alternate embodiment, the activator module 18 can form part of a distributed processing and control system, such as is illustrated in FIG. 6. The activator module 18 can transmit via a transmitter (such as transmitter 38) a selected radio wave signal 20 for powering the label and/or instructing the label to display particular indicia. The activator module 18 can be configured to transmit commands, instructions, software programs, or variables associated with either the pixel address locations corresponding to the label display, the indicia to be displayed by the label, or instructions for use by the label at a later time, as well as instructions for other functions associated with the operation of the label, including, providing power signals for powering the label. When the integrated, remotely alterable and updateable electronic label 16 is brought within the field or range of the activator output signal 20, the power antenna 48 of the label can be activated by any power signals transmitted by the activator module 18. The power antenna 48 receives the power signals generated by the activator module 18, which are then converted by the power converter 60, FIG. 5, into suitable power (e.g., current or voltage). The power supplied to the electronic label 16 is sufficient to actuate the processor 24. The processor can be programmed to receive instructions to change, alter or maintain indicia displayed by the display assembly 30, as described above. For example, if the display assembly is blank, or if it is desired to change indicia displayed by the display assembly 30, the processor 24 retrieves data stored in the storage element 28, converts the data into pixel addresses and following selected or predefined sequences applies the necessary power to the signal paths within the activation grid matrix layer 44 to create the display. In this embodiment, the label 16 is constructed as a smart label and employs on-board storage and instructions for performing the operations and for displaying selected indicia. The processor 24 can also be constructed to process only instructions received from the activator module 18, and hence functions as a dumb label. The processor 24 can address selected pixel locations in the grid matrix layer consistent with the predefined sequence in order to actuate the electronic ink disposed in the electronic ink layer 42. The processor in connection with the activation grid layer 44 and the electronic ink layer 42 forms selected human and/or machine readable indicia in the display.

Additionally, the electronic label 16 can transmit signals from the electronic label 16 via the transmitter layer 52 (e.g., antenna 22 in FIG. 2). The transmitter layer 52 and the receiver layer 50 can be employed in connection with the activator module 18 to exchange or update information. Hence, the transmitter layer 52 can transmit a signal to the activator module 18 containing information about the status of the label or about the position of the label relative to the activator module 18.

The label 16 can be used with one or more other labels to form a group or an array of display devices that can be remotely updated or altered in similar or different ways to display similar or different information. The labels in this array can also have different information stored in memory, and hence function in ways different from other labels in the array. Thus, one or more activators can be used in connection with the label array to actuate or instruct the labels in the array to perform or execute pre-determined routines and/or to display predetermined indicia. Different electronic labels can also be employed in the same application, at the same time, and in the same area. The labels in the array need not display information at the beginning, nor all be employed at the beginning. For example, the labels can be used as admission tickets or passes for an amusement park, and can have different values stored in memory in the same type of data field, such as the number of times the label is used, or communicates with the activator module. The label can employ a selected color scheme by employing various background colors to identify the number of times each label is turned on or off. If turned off, each time power is restored to the label, any new indicia can be displayed on a different color background, which may or may not be the same as the background on another label in the array. Moreover, all or a portion of the information shown on the display may from time to time appear to be static and/or dynamic, motion picture, or 3D.

Figure 7:
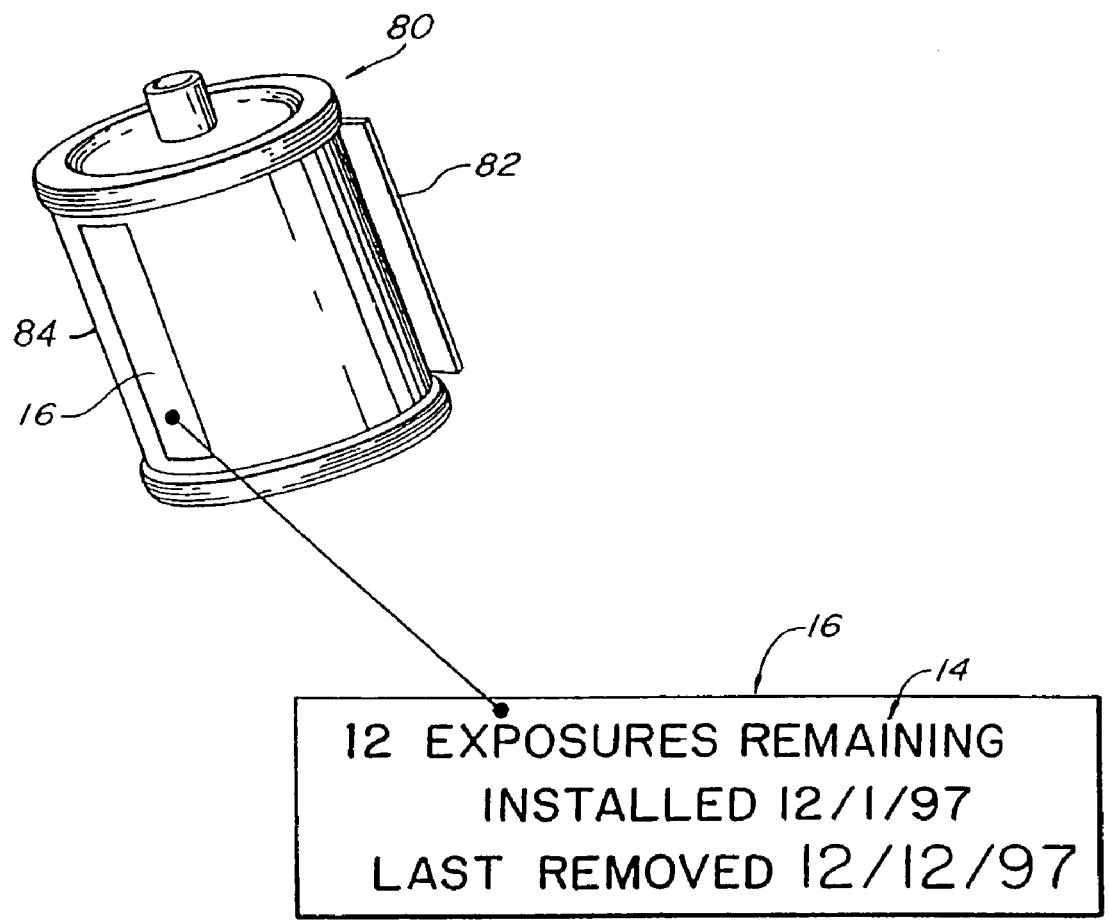
FIG. 7 is a perspective view of a roll of film employing the electronic label in accordance with the teachings of the present invention.

FIG. 7 is a perspective view of one application of the electronic label 16 of the present invention. The illustrated label 16 can be used, attached, secured or affixed to a camera, camera accessories, film container or to the illustrated roll of film 80. The film 80 has an outer body 84 that protects a film 82. The label 16 can be sized and dimensioned for securing to the outer body 84. The label 16 can communicate, if necessary, with the activator module 18. The label 16 of the label system 10 can also be used to automatically and reliably alter the information 14 displayed by the display assembly to reflect all or a subset of the information temporarily or permanently stored in the storage element. The stored information can include a unique label/tag identification number, type of film, total number of exposures, remaining number of exposures, A.S.A. speed, date film was manufactured, date film was first placed in the camera, type of camera, date film was removed from the camera, date of processing, location of processing, encrypting software, security codes, and anti-counterfeit software.

In this application of the electronic label, the transmitters and receivers of the activator module 18 can be mounted in the camera. This mounting configuration can be accomplished by creating the necessary circuitry as part of a single or multi-layered integrated circuit built into each camera. The camera can be powered by different sources, for example, by an onboard battery or a charged capacitor that stores energy from mechanical motion, from the nearest activator module or from a proximate cell phone network. Once the activator module employed in connection with the label 16 is powered, it can begin to transmit, as often as appropriate, power signals to the label 16. Once powered, the label can be synchronized with the activator, or can proceed to display indicia on the display assembly in accord with pre-stored instructions, or in accord with signals received from the activator module.

The camera can also be configured to mount a microprocessor that can transmit signals as events dictated. For example, when the camera is turned on, the camera can be focused and a picture taken. Each time a person takes a picture the label 16 on the film 80 can be updated to reflect the latest frame status in preparation for when it is removed from the camera, which can be between any exposure or at any time. The film on which the information is displayed can be of any suitable format, and can include plate type or cartridge type film. The label 16 can be formed as an integral part of the container or as an integral part of the film.

The camera, film container, or film also employs or operates in conjunction with an activator module. The activator module can be mounted within a still camera, motion picture camera, disposable camera, cartridge camera, 35 mm camera, SLR camera, x-ray machine, camera case, film developing equipment, film manufacturing equipment, table, chair, light fixture, television, DVD player, home entertainment system, cable television, satellite television, centralized systems and/or data bases, keyboard, mouse pad, computer peripheral, personal data assistant, voice activated device, computer, microprocessor, Java box, common/shared database, files, computer network, electronic data interchange network equipment, e-commerce system, internet, the world wide web, intranet, Intelligent Appliance phone system, RF computer network backbone, Local Area Network (LAN) connecting one or more computers, Wide Area Network (WAN) connecting one or more computers, serial or parallel wire connection to one or more computers, optical connection to one or more computers, electromagnetic connection to one or more computers, or computer or network operating system.

Figure 8A:
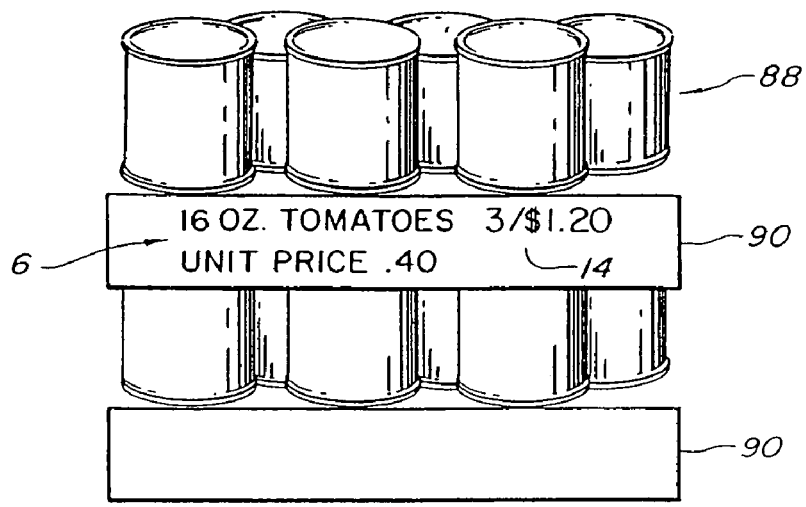
FIGS. 8A and 8B illustrate one application of the electronic label of the present invention used in a retail store environment in connection with the sale of consumer products. In this illustration canned goods are shown.
Figure 8B:
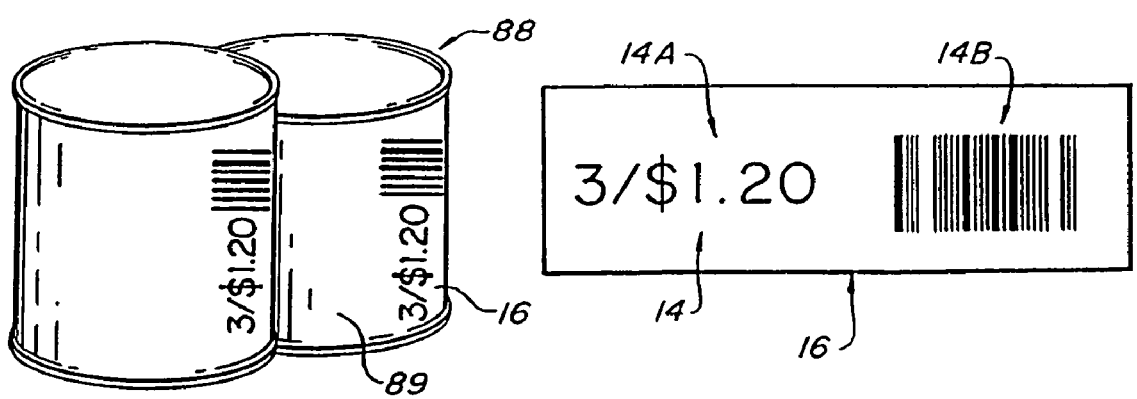

The electronic label system 10 of the present invention can also be employed in a retail store environment. FIGS. 8A and 8B illustrate the use of a label 16 in connection with a number of canned goods 88 seated on a shelf 90 found in a retail store establishment. The illustrated canned goods are only one example of how label 16 can be used in a retail establishment to sell a retail item. The label can be fashioned as a shelf tag, hanging tag, or a tag directly attached to the item or in an item supply or stocking procedure where the items are identified either directly or indirectly to a shelf label. The label 16 can be mounted to the front portion of the shelf. The label can display indicia corresponding to certain selected parameters, such as price. The label 16 can be used in connection with any item in the retail establishment to display information about the item. The electronic label 16 mounted or secured to the floor shelves can be manufactured with a shape consistent with standard shelf marking labels. The labels can arrive to the retail store blank, and then be programmed or instructed to display selected information.

FIG. 8B illustrates an alternate mounting scenario where the label 16 is mounted to an outer surface 89 of the canned goods rather than to the shelf 90. The label can display indicia 14 related to canned goods, such as number and price 14B, as well as a barcode 14B. The label can be an integral part of the can paper label or packaging. The blank labels can be secured to the items according to any standard method, such as glue, stitching, weaving, sewing, lamination, snapping, pinning, tacking, clipping, and the like. The information indicia displayed by the label can be actuated by an activator module 18, either held by a clerk or formed or connected as part of the store's computer system. The retail store can be wired so that one or more fixed activators eliminate the need for a portable activator module. The label system 10 can be employed to change the indicia displayed by one or more labels in the store to reflect price changes, such as sales or manager's specials. The system thus creates a relatively easy and time efficient method for effecting changes in the human or machine readable indicia displayed by the label. The system thus eliminates the need for manually erasing old information displayed for each item or group of items.

The labels can be attached to different items in any type of retail establishment and can display different prices for each item or group of items. A single activator can be used to remotely update or alter the displayed prices, such as reducing the price of the items a selected amount. Each label receiving the signal from the activator module can independently calculate a new price and change the display to reflect the price change.

The label array or group of labels can also be used to identify admission prices to a facility, such as an amusement park. The labels can be configured as wristbands mounted about each park entrant, and can display pre-determined information, such as date, type of pass, and price, as well as information relating to park attractions, such as rides or refreshment stands. This information can include waiting times for certain rides, the location of restrooms and food courts, the remaining balance of previously purchased park money and the like.

Figure 9:
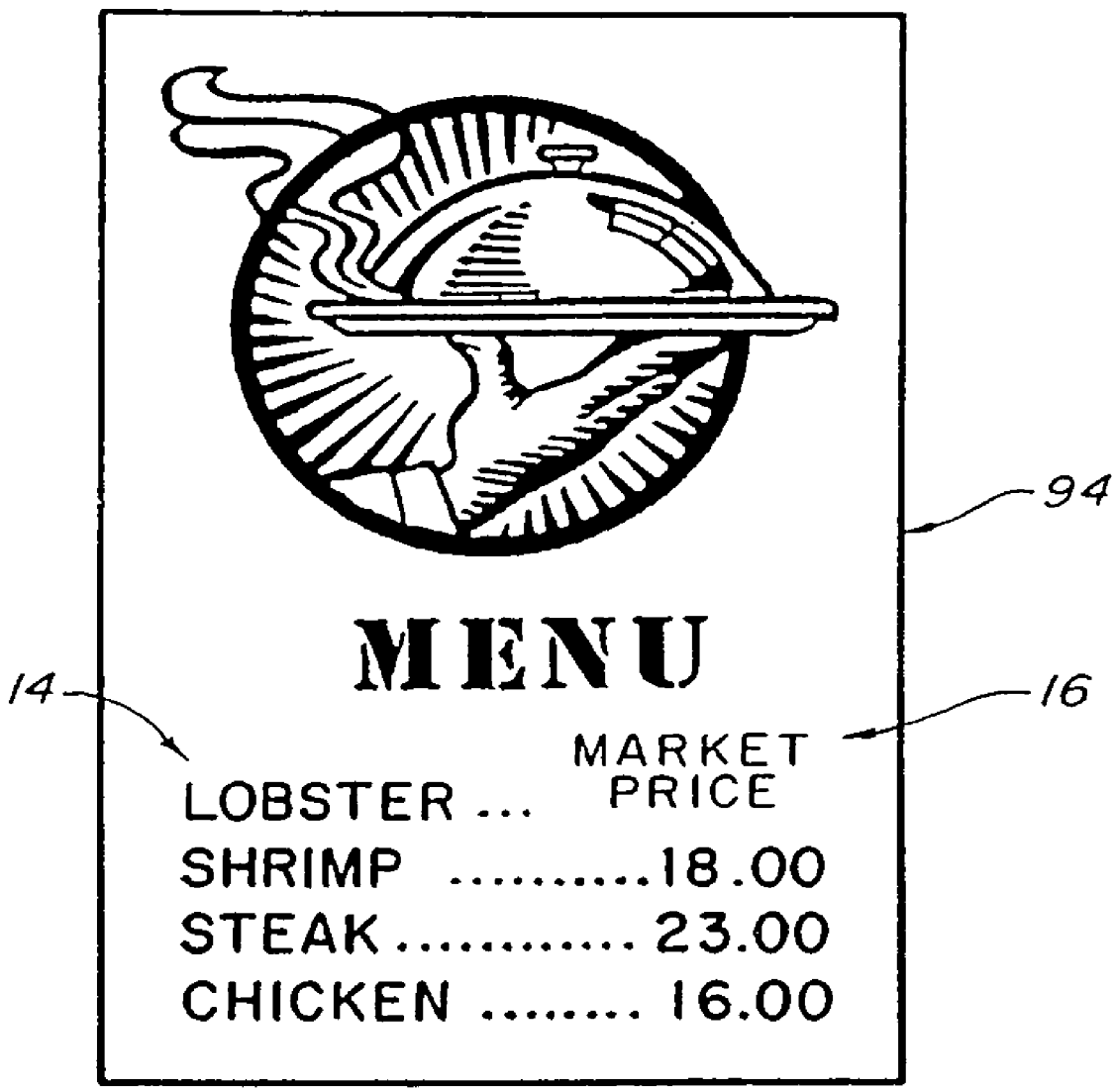
FIG. 9 is a perspective view of the electronic label of the present invention used in connection with a menu.

FIG. 9 illustrates another embodiment of the label system 10 according to the present invention. The illustrated menu 94 can mount a label 16 thereon, or the label 16 can be integrally formed as part of the menu. The label 16 displays indicia associated with the restaurant, such as food type and price. The display portion of the label can display either a portion of the menu or the entire menu. The label can also be configured to display any other information or graphics suitable for the restaurant. The menu 94 can be updated via the on-board label electronics, or by an activator module mounted in the restaurant, or held by the waiter or other employee. For example, if the activator is mounted by a cash register or hostess table, several menus 94 can be updated at one time by the activator. If the entire restaurant is covered by one or more fixed activators, the menu 94 can be updated at any item, even when the menu is on the table or in the customer's hand. The ability to seamlessly, remotely or locally update the menu display is advantageous since the restaurant can in real time inform a customer when the kitchen runs out of an item or has to make a substitution. Price changes based on market price, business costs of good or competition can be changed as necessary. The display can also be altered or updated to reflect changes in food offerings, changes in ingredients of food offerings, options for preparing food offerings, specials of the day, price changes, changes in market prices of menu items, menu identification number, restaurant name, type of meal (e.g., lunch, dinner, ala carte, etc.), item price, portion size, unit price, market price, soup or vegetable of the day, server's name, manager's name, color, shades, promotion logos, promotional symbols, customer name, restaurant club membership designator, personal customized message, encrypting software, security codes, and anti-counterfeit software, and the like.

The size of the activators for this label system are proportional to the distance over which they transmit signals. The activator module can be integrally formed as part of a device sized and dimensioned for communicating with the label. The activator can be placed at locations to provide a selected amount of coverage, such as in or near the ceiling. All menus can respond to the activator module by transmitting back their unique identification and all of the data and information necessary to allow the activator module to determine which menus need to be updated, for example, updating only the children's menu.

Figure 10:
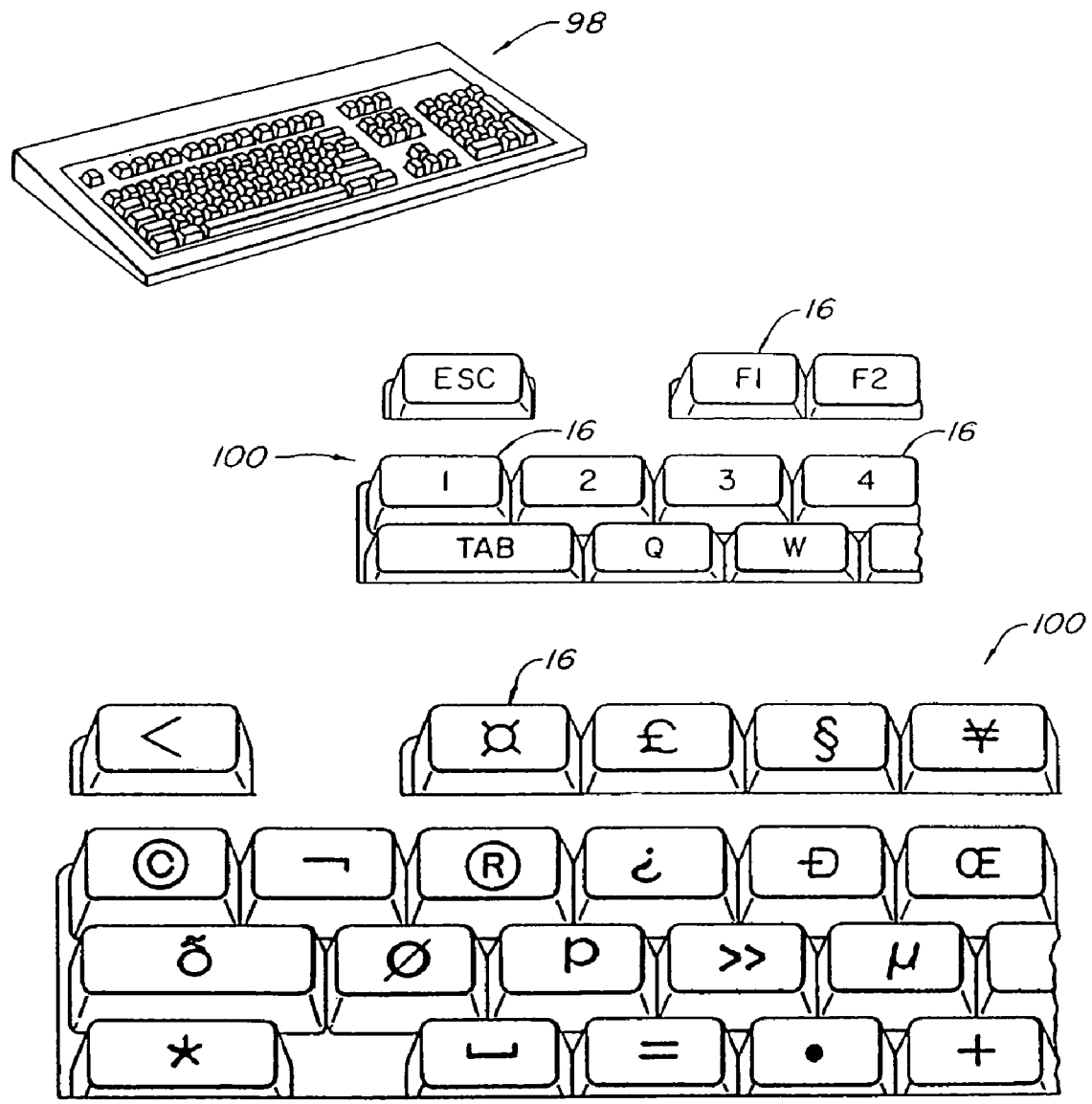
FIG. 10 is a perspective view of an array of electronic labels used in connection with a keyboard.

FIG. 10 illustrates another application of the label system 10 of the present invention. FIG. 10 illustrates a keyboard 98 having a plurality of keys 100. One or more of the keys 100 can have mounted thereon a label 16. The activator module employed in connection with the keyboard can be mounted in the keyboard, or nearby in the computer or monitor. The label 16 can be activated to change or alter the symbols displayed in connection with each key. Other embodiments include molding electronic displays into special function keys, general purpose buttons or dials or any other device that uses a visual representation to indicate what happens when a person presses, pushes, pulls, turns, twists or lifts it. The remote ability to change the indicia displayed by the label without direct electrical contact is useful in applications where prolonged or repeated mechanical uses would wear out any direct electrical connection. The keyboard containing the labels can be updated or changed as the application or situation dictates. The information, data pictures and icons displayed can therefore be context sensitive. The display can be changed based on the environment, the user, the application, the user's level and experience, and the like.

Figure 11:
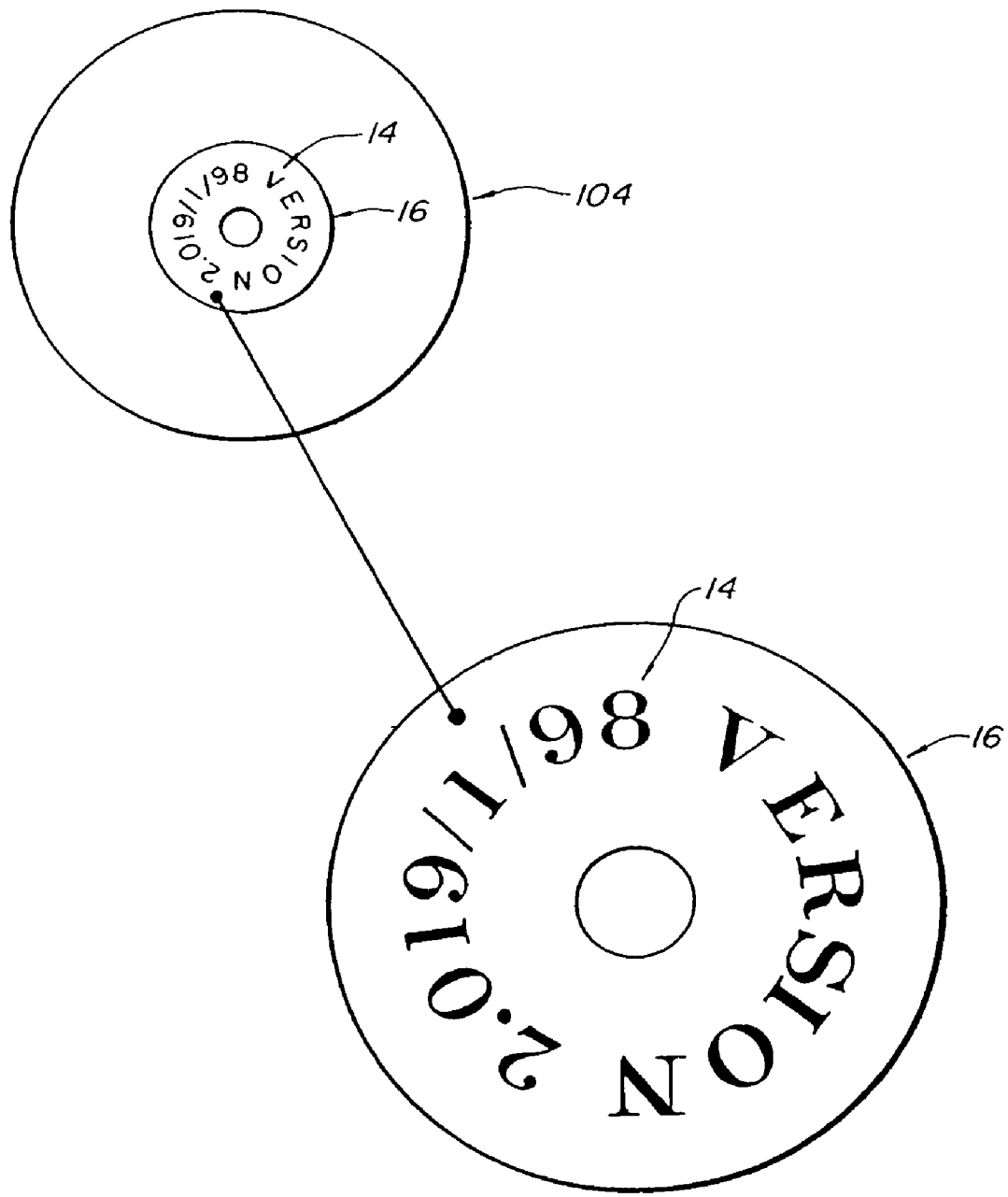
FIG. 11 is a perspective view of the electronic label of the present invention used in connection with a recording media item.

FIG. 11 illustrates another application of the label system 10 of the present invention. FIG. 11 illustrates a recording media device 104 that has mounted or secured thereto a label 16. The label can also be integrally formed or molded as part of the recording media device 104. The label 16 can display information 14 related to the recording media device or the information stored thereon. The term "recording media device" is intended to include any device for recording, storing, capturing or holding information, such as video information, audio information, and data and the like. For example, the label can be attached to the plastic housing of a computer diskette, a zip disk, a DVD, a VHS tape, or a music cassette. In the case of diskettes, the label can be attached to the jacket inserted into a disk drive. The label can also be fabricated directly into the media, such as in the center of a CD or DVD. In the case where the recording media device is a disk that has a label secured thereon, the label can display information related to the contents of the disk, such as the type of software, files, version number, amount of available storage space, and the like. The information displayed by the label 16 can be updated in real time, such as during use, or at any other appropriate time. For example, when a new file is written to a diskette, the size of the file or directory and the date of the file or directory was last can be shown on the label. According to one practice, the label can display and update this information while the diskette is in the disk drive.

The information displayed by the label 16 can be altered each time the media device 104 is placed into an appropriate structure, such as disk drives, digital video disk drives, zip drives, laser disk drives, and the like, and tape drives, such as magnetic tape drives, and recording tape drives. The activator module can be mounted within the housing of the disk drive. Since the activator module does not need to make direct contact with the disk, the activator can instruct the label to alter or update information displayed by the label even while the disk is spinning. The activator module can thus be configured for activating the label independent of label movement. The activator module can also be disposed as another computer device integrated with other equipment, which can stand alone on a desk or tabletop or can be hand held. The activator module can be used to update information in connection with cash cards, electronic wallets, debit cards, bank cards, etc. Since maintaining direct contact and/or proper alignment and or constant distance or speed or line of sight are not required by the label system 10 of the present invention, the system can be installed and easily used. For example, the user places the recording media device into the suitable structure, such as a disk drive, so that the drive can read or write information to the media device. The user then removes the media which now contains a visual record of what is recorded on the media device. Other embodiments of the media device include media devices used for computers or entertainment, such as a laser disk, video cassette, VHS cartridge, Beta max cartridge, zip drive, or any other type of optical or electromagnetic media.

The recording media device can also be used for items carried in a person's pocket, wallet, or purse, or to items a person uses to track debit or credit card balance, activity, status, goals, rewards or bonus levels, and benefits. Examples of such items include permanent account items, such as charge cards, electronic purses, credit cards, debit cards, telephone cards; temporary account items, such as mass transit fare cards, telephone cards, vending machine cash cards; memberships, such as memberships in commercial establishments; and identification items, such as ID cards, food cards, insurance policy identification cards, driver licenses, public and private lottery tickets, and warranties.

In another application, the electronic label 16 of the present invention can be employed by the travel, postal or packaging industry, such as airlines, to label a variety of items, including packages, letters and luggage. In the case of the airline industry, the electronic label can be used to replace conventional tags or stickers that are manually applied to the luggage by the airline. By employing the electronic label of the present invention, the label can be configured as a disposable label that can be discarded after use. Conversely, the label can be configured as a re-usable label that is reprogrammed or instructed to display indicia associated with another passenger's luggage. In addition, the label 16 can be manufactured as an integral piece or part of luggage or shipping container so that it can be cleared after each trip and display new indicia.

In this application, the electronic label 16 of the present invention can be employed when a passenger is checking in. First the proper passenger information can be retrieved from the airline reservation system. Attached to the reservation system at the check in point can be an activator module, such as module 18. The module 18 can be mounted in the counter walls near the luggage weight scale, in the check in counter proximate the luggage scales, or the module can be an integral part of the scale, or it can be constructed as a hand held device that the check in attendant or curb side baggage handler places near the passenger's luggage. The activator module 18 can communicate and update several electronic labels at once. Alternatively, fixed location activator modules can be placed at strategic locations along the end to end system wide baggage handling process. This includes the conveyor belts that move the luggage between the check in counter and the plane. For example, every time the luggage is switched from one conveyor belt or system to another, the activator module can change the label indicia signifying the status of the luggage. When the luggage is removed from the plane and placed on a cart, another activator module 18 can alter the display to identify the luggage destination. This is especially useful for connecting flights or long layovers or when a plane is removed from service after the luggage was initially loaded on the airplane. Activator modules can be placed at the cargo bay entrances to the airplanes luggage compartments. Activator modules can also be part of the large common containers used to load the luggage. Alternatively, the activator modules can be placed at baggage pick up conveyor belts and at exit doors.

The activator modules can be placed in communication with a host processing system or with a standalone processing system. If a stand alone integrated labeling system is employed, the non integrated activator module can display the current status of the luggage, which can then be connected to the host system or primary computer. The system can be updated the next time the tag comes within the electromagnetic field of the activator, or when the activator is connected to the system. In either case, some or all information on the label, when updated, allows the machine or human to adjust the steps taken based on what is shown.

Additional security measures and theft prevention, and prevention of loss of luggage and improper routing of luggage can be accomplished with this electronic labeling system, especially since there can be remote standalone locations that automatically change the information displayed. The bar codes are changed as necessary to reflect the changing status of the relevant information thereby increasing the level of routing automation that can be applied to a given piece of luggage.

According to another application, the label can be employed in connection with a built in Global Positioning Satellite (GPS) system to store the position when the electronic label was last activated. A common signal command is transmitted by the GPS system. These signals are received by the label whenever power is available. The processor can determine the current label position from these signals. The label can then process the GPS signals locally and change the label display if necessary.

According to another application, the labels can receive from the activator module a common encrypted message signal, instruction or command. The labels in the array can be assigned unique encryption keys. Therefore, a common encrypted message broadcast to the electronic labels can be decoded only by a subset of the labels receiving the broadcasted signal.

In accordance with another application of the present invention, the electronic label can be affixed to, or become part of, items used to permanently or temporarily capture, record, hold or store information as part of an item associated with a physical monetary instrument and/or a physical representation of a transaction. The term "monetary instrument" includes physical or non-physical instruments intended to signify, identify, correspond, or represent value of some amount. For example, the monetary instrument can be an item of value, such as paper currency, stock and bond certificates, government or corporate bonds and certificates, vouchers, checks, deposit slip, withdrawal slips, treasury notes, currency wrappers, and the like, or represent an item of value, such as financial information, transaction receipts, and the like. The electronic label can afford multiple levels of security for the physical monetary instruments. For example, public and private encrypting keys and other forms of electronic security can be disposed (burned) into and/or downloaded into the electronic label.

The characteristics of the electronic ink contained in the display portion of the electronic label can be modified to give specific predetermined responses to outside physical interrogation. For example, fluorescent ink illuminates when excited with the appropriate radiation from an external source. The characteristics of the electronic ink contained in the display portion of the electronic label can be configured or constructed to give specific predetermined responses to signals received by the electronic label. For example different layers of display with different optical characteristics can be activated to respond with patterns based on a decoded message. The electronic label can also be adapted to alternate between displaying a message in the visible wavelength range and displaying a fluorescent message. Those of ordinary skill will readily recognize that other types of ink can be used including fluorescent, iridescent, bioluminescent, incandescent, ultraviolet, infrared, and wavelength specific radiation absorbing material. A variety of these optical characteristics can be combined to provide additional mechanisms for authentication and security of monetary instruments.

Other applications related to monetary instruments can include employing a label (such as in strip form) in connection with one or more monetary instruments, or with a stack or selected number of monetary instruments. The activator module can then be employed to interrogate or communicate with the labels to determine the number of labels and the type and/or number of monetary instruments. From this information, it is relatively easy to determine the amount of money at a selected location. Alternatively, a built in activator module can be mounted in a mechanical bill counter. This arrangement ensures that all monetary instruments passing through the counter are authentic based on a unique serial number encrypted in a label mounted within or formed as an integral part of each bill.

The display assembly can display information associated, related or corresponding to the monetary instrument. The label also employs structures, such as the processor, for automatically altering the displayed information to reflect all or a subset of the information temporarily or permanently stored in a storage element mounted in the label. For example, the label can display information associated with the value of a certain number or type of currencies (e.g., dollars, deutschemarks, francs, pounds, etc.), an account number, an identification number (e.g., a serial number), an organization or country or government that initially issued the monetary instrument, a financial institution, electronic financial routing information, security codes, and encrypting and anti-counterfeit algorithms.

An activator module can be used in connection with the monetary instrument for activating the label associated therewith. The activator module can be integrally formed as part of a receiving device sized and dimensioned for receiving or communicating with the monetary instrument. The receiving device can include a money counting machine, counterfeit inspection station, cash register or draw, securities validation machine, bond validation machine, and an ATM machine. The activator module can alter information in the label without necessarily contacting the label or the monetary instrument. For example, the activator module can update the label display even when the monetary instrument is in a pocket, non conductive package, cash/bill holding compartment in a wallet or purse, non conducting cash registers and bill counting machines, gambling table cash draw, and non conducting bank teller draws.

According to another application, the label of the present invention can be secured to a card sized item used to hold or store at least one of a monetary balance, an account number, identification indicia, and instructions, as well as any other information suitable for a particular intended use. The card sized item can be sized and dimensioned for placement into a suitable holder element, such as a shirt pocket, wallet, purse, bill fold, business card case, credit card bill fold, picture holders, and checkbook, or an item issued in connection with a permanent financial account, a point based account, a temporary monetary account, a membership, a promotion service, a travel related service account, a charge account, a credit account, a debit account, a bonus account and an identification card. Examples of such cards include a debit card, credit card, cash withdrawal card, discount card, mass transit fare card, phone card, membership card, security card, driver's license, ID card, employee card, convention badge/card, gambling club card, keys for electronic door locks, insurance cards, toll cards and the like. The label can be integrally formed with the card sized item or formed from the same material that forms the label. The card-sized item can also be configured for storing software for automatically updating machine readable indicia to create or display optical symbologies (e.g., 2D bar codes) on the display assembly. The label can then be used in connection with electronic indicia reading equipment, such as a bar code reader, for reading the optical symbologies from the label.

The label can also be used with an activator module that is integrally formed as part of a device sized and dimensioned for receiving or communicating with the item. Examples of such items include a telephone or telephone booth, turnstile, doorway, cash register, card reader, vending machine, electronic purse reader, electronic wallet reader, ATM machine, automatic lock/door opener, mass transit fare box, security access stations, doorway, electronic door lock, badge reader, cash register, card reader, strip reader, vending machine, and parking lots and garages. The activator can alter information in the label independently or without directly c contacting the label. For example, the activator module can alter or update the label when the card is disposed in an article of clothing, a non conductive package, a wallet, purse, bill fold, business card case, credit card bill folder, wallet picture holders, or checkbook.

The electronic label system of the present invention can employ software for altering or changing the price of an item or a group of items based on real time supply and demand. The label system can monitor the number of items purchased by monitoring the number of items passing through the checkout. From this information, the system can track inventory (how many items on the shelf), and can instantaneously adjust the price displayed by the label in response the supply and demand. The label system can also change, alter or modify the information displayed by the label in connection with the item as the item moves through various manufacturing steps, wholesale/retail distribution, sales, purchasing, customer or end user transporting.

According to another application, the label 16 of the present invention can be attached to or fashioned as a wristband or ankle band for use by a person or animal. The label 16 can display information relating to the person or animal, an item worn by the person, the current site or location of the person/animal, the service to which the person is entitled, employment or personal related information, convention attendance related information, routing information for the person/animal, selective portions of the history of the person/animal, as well as any other suitable information. The label can also be sized and dimensioned for securing to an item worn externally and readily visible, such as decorative pin, badge holder, pendant, necklace, badge, or made as part of an article of clothing or gear worn by a person (e.g., hat, jacket, knapsack, belt) or the like or to an item (e.g., card, coin, token) carried by the person in a location from which it can be easily retrieved and presented (e.g., pocket, wallet purse).

The label 16 can be used to convey information to other people or to machines adapted to act upon all or a portion of the information displayed by the label. The information can be used to identify the person or animal in possession of the item, to allow access to a secured or unsecured facility or site, or to receive special privileges. The display portion of the label can readily display information that directly identifies the bearer, such as by name, image, or identification number, or to anonymously identify the bearer, such as by possessing the item. Examples of sites or facilities that the label can allow the bearer to gain access include but are not limited to an amusement park, theme park, amusement ride, arcade, racing event, beach, pool, fair, park, zoo, museum, art gallery, festival, sporting event or activity (e.g., skiing), concert, entertainment event, tournament, spa, hotel, motel, inn, or resort, political event, convention, industrial show, exhibit, educational/training institution, hospital, nursing home, extended care facility, camp, jail, prison, place of employment, security sensitive area, government building, military installation, movie, theater, cruise ship, auction, livestock feeding or raising facility, and parking garage.

The label 16 can also be used to track the position or status of a person or item, as well as track the number of times an activity is performed, the number of uses remaining for a given activity, how many times a ride is taken, the number of uses remaining for a given ride, remaining balance of prepaid spending money, and the like.

The label can also be formed as integral to or in replacement of the item. The item and/or label can also be formed as a wristband, ankle band, bearer card, ear clip, identification tag, identification card, admissions card, admission badge or pass, livestock tag, re-entry pass, allowance card, pendent, pin, convention, symposium, or employee badge, electronic door key, security badge, admissions ticket, pass, electronic door key, fan card, club membership card, team identification card, hat band, hat pin, tag, belt, collar, ring, earring, health insurance card, medical alert band, traveling card, decorative pin, badge holder, pendant, necklace, badge, or formed as part of an article of clothing or gear worn by a person (e.g., hat, jacket, knapsack, belt) or the like.

According to another application, the label system of the present invention can be used to provide visible mailing/shipping/routing information about the destination of a letter, package or luggage. The label 16 can be an integral part of the luggage, overnight mailing package, or shipping container to display information about the luggage, letter or package to which the label is attached. The items can be typically handled by an airline, cruise line, train, tour operator, hotel luggage handler, luggage storage area, bus company, overnight express mailing company, parcel post shipper, package delivery service, government postal organization, bulk mailer, catalogue shipping, home shopping organization, record club customer shipment, internet shopping customer shipment, home television shopping customer shipment, e-commerce customer shipment, department store customer shipment, retail store customer shipment, or sweepstakes mailing.

The label system of the present invention when used in this manner can allow people or machines to display all or a subset of the information stored in the label in order to determine the person traveling with the luggage, identify the owner of the luggage, appropriate routes of travel for the luggage, class of service, identity of person shipping/mailing a package, type of service desired for shipping/mailing, amount paid to ship/mail a package, routes for delivery, transfer points for luggage, connecting flights, airport transfer hubs, transfer points for packages being mailed, sorting locations for letters or packages, and identity of selected ports. When used in this manner, the label 16 of the label system 10 functions as an address or shipping label, luggage tag, adhesive or stick on shipping label, luggage storing label, passenger identification tag, and/or airline ticket.

In this application, the activator module can be part of or comprise an airline check in counter, airline ticket issuing printer, e-ticket kiosk, baggage check in kiosk, skycap check in station, boarding gate, departure door, airplane boarding ramp, automated baggage handling system, portable baggage ramp conveyor belts on trucks, cargo/baggage doors of an airplane, transfer point on baggage conveyor belt, intersection of baggage conveyor belts , reading stations on baggage conveyor belts, baggage pick up conveyor carousels, door ways, security check points, ship hatches, cabins, ship loading ramps (gangways), cargo/luggage storage holds, luggage compartments, hotel entrances, hotel check-in counters, bell stands, wheeled luggage racks, hotel room entrances, storage rooms, car trunks, bus luggage compartments, tractor trailer loading docks, tractor trailer loading doors, post office clerk windows, delivery person, pick-up person, deliver truck, pickup truck, walk-up manned mailing window, walk-up unmanned mailing window/drop off boxes, drive-up mailing window/drop off, self standing overnight mailing kiosks, mail boxes, drop boxes, automated parcel moving system, automated mail sorting systems, automated postage canceling system, automated postage affixing system, cars trucks, mail trays, mail containers, parcel bins, parcel/mail sacks, turnstile, doorways, door, gates, turnstiles, elevator, escalator, access/security monitoring system, reservation system, seat assignment system, American Association of Travel agents reservation system, SABRE system, travel ticketing system, boarding monitoring system, luggage tracking systems, centralized systems and/or data bases, keyboard, keypad, Personal Data Assistant(Palm Pilot), voice activated device, stand alone computer, stand alone PC, inventorying equipment, common/shared data base, files, centralized computer, computer network, electronic data interchange network equipment, e commerce system, world wide web, internet, intranet, network, phone system, RF computer network backbone, Local Area Network (LAN) connecting one or more computers, Wide Area Network (WAN) connecting one or more computers, serial wire connection to one or more computers, parallel wire connection to one or more computers, optical connection to one or more computers, electromagnetic connection to one or more computers, and a computer or network operating system.

The activator module 18 of the label system 10 can have any size and shape and can be mounted at any suitable location. For example, the activator module can be a stand alone antenna or multiple antennas, or mounted in or at a wall, floor, ceiling, light fixtures, tram, turnstile, doorway, door, gate, entry way or passage way, swinging arm/gate, elevator, escalator, moving sidewalks, airline check in counter, ticketing kiosks, check in kiosks, travel related kiosks, skycap check in counter, boarding gate counter, departure gate doorway, departure gate doorway, boarding pass collection equipment, airplane boarding ramp, entry and exit portals/openings into/out of automated baggage handling systems, portable baggage ramp conveyor belts on trucks, cargo/baggage doors of airplanes, proximate baggage handling conveyor belts, reading stations on baggage conveyor belts, baggage pick up conveyor carousels, security check point portals, carry on luggage checking equipment, ship hatches, ship cabins, ship loading ramps (gangways), cabin entry door/hatches, cargo/luggage storage holds, ship luggage compartments, hotel entrances, hotel check-in counters, bell stands, wheeled luggage racks, hotel room entrances, storage rooms, car trunks, bus luggage compartments, tractor trailer loading docks doorways, tractor trailer doorways, post office clerk windows, recording or logging devices carried by delivery/pick up person, deliver truck doorways, delivery trucks, pickup trucks, customer servicing counters, cash registers, weighing stations, scales, local postal issuing stations/offices, windows, passage ways for packages, mailing kiosks, mail boxes, drop boxes, automated parcel moving system, automated mail sorting systems, cars trucks, mail trays, mail containers, parcel bins, parcel/mail sacks, equipment used by postal clerks, equipment used by airline check-in agents, equipment used by shipping and receiving personnel, equipment used by pick-up and delivery personnel, doorways, door, gates, turnstiles, elevator, escalator, keyboard, keypad, personal data assistant, voice activated device, computer network, a stand alone computer, mouse pad, computer peripheral, microprocessor, and Java box.

According to still another application, the label 16 of the label system 10 can be sized and dimensioned to be secured to a general purpose game board, integrally formed as part of the game board, or formed from the same material or stock that forms the game board. Likewise, the label can be secured to game pieces, integrally formed as part of the game piece, or formed from the same material or stock that forms the game piece. According to one practice, the label can be attached to or formed as part of the covering of an appropriately sized and shaped game board top, upon which the game is played. Examples of types of game boards and game pieces include a checker and chess board, Parcheesi board, Monopoly board, Scrabble board, Backgammon board, BINGO, Trivia pursuit, Mahjong board, UNO, Life, and Chutes and Ladders. A single game board can be provided, and the display can be altered to represent the game board for a selected game. For example, the label can first display a checkers board and then display a Backgammon board, when desired. The label system 10 can alter the display based upon selected programs to create a dynamic game. For example, a new type of dynamic game can be created using an array of game pieces, each containing the label system 10 and/or game boards that include the label 16 and activator module. The system 10 can alter the appearance and meaning of the game board and/or game pieces throughout the game.

The label 16 of the system 10 can also be used to automatically and reliably change the appearance (pixels) of the display assembly to reflect all or a subset of the information temporarily or permanently stored in the storage element of the label. The information stored in the storage element can include a unique label/tag identification number, name of game, logo of game, lines, squares, boxes, start point, end point, finish, value, name of establishment, odds, numbers, letters, words, imaginary characters, characters, color, shades, encrypting software, security codes, and anti-counterfeit software.

New and different variations of table and gambling games can be created by incorporating the label system 10 or label 16. Examples of such games include blackjack, roulette, craps, Caribbean poker, Baccarat, pool, billiards, and bumper balls.

Similarly, the activator module 18 of the label system 10 can comprise or be formed as part of a black jack table, craps table, roulette table, Caribbean poker, Baccarat, pool, billiards, bumper balls, gambling monitoring/surveillance system, security system, electronic poker network, electronic cumulative jackpot system, video game, Windows based game Application, dedicated game microprocessor, table, chair, light fixture, electronic table top, television, DVD player, home entertainment system, cable television, satellite television, centralized systems and/or data bases, keyboard, keypad, personal data assistant (Palm Pilot), voice activated device, stand alone computer, common/shared data base, files, computer network, electronic data interchange network equipment, e-commerce system, internet (including the world wide web), intranet, phone system, RF computer network backbone, Local Area Network (LAN) connecting one or more computers, Wide Area Network (WAN) connecting one or more computers, serial wire connection to one or more computers, parallel wire connection to one or more computers, optical connection to one or more computers, electromagnetic connection to one or more computers, computer or network operating system. The activator module can be placed or mounted on, under, behind, within, integral to, suspended from, covering, or attached to an object normally found in all types of homes, game rooms, casinos, bingo parlors, pool halls, camps, schools, day care centers, gyms, health clubs, spas, and the like.

According to another application, the label 16 of the label system 10 of the present invention can also be used in connection with an information organizing item, such as a calendar, day timer, phone book, address book, recipe book, planner, appointment scheduler, rolodex, date book, agenda planner, guest book, and log book. The information organizing item can be attached to a larger piece of furniture or equipment, such as a refrigerator, desk, counter top, credenza, table, bulletin board, door, desk organizer, or cabinet, and the like. The label can be adapted to automatically and reliably alter or update the information shown by the display assembly to reflect all or a subset of the information temporarily or permanently stored in the storage element of the label. The stored information can include a unique label/tag identification number, type of organizer, manufacturer name, day, month year, date, time, appointment, birthday, holiday, meeting, telephone number, street address, street name, city, state, zip code, e-mail address, lines, boxes, squares, phone message, names, call back time, encrypting software, security codes, and anti-counterfeit software, and the like.

The label system 10 can also employ an activator module mounted relative to the information organizing element so as to actuate the label 16, if necessary. For example, the activator module can be mounted beneath the display of the information organizing element to display information. It is apparent that associated elements of the label system can be configured to determine electronically, optically (laser or infrared light beams), or mechanically (via pressure sensors or stylus), selected information, thus allowing the display to be modified in real time. This allows information to be displayed as it is entered, while concomitantly enabling and creating the appearance and ability to write or draw.

The display assembly can be self contained on the information organizing item and can be powered by a battery disposed local to the item, such that the entire item becomes self contained and can be updated wherever and whenever desired.

The illustrated electronic label 16 or electronic labeling system 10 can be employed in a number of additional environments, applications or uses. Examples of such environments, uses and applications as set forth above are not intended to be exhaustive of the total number of applications, and is not intended to limit or preclude additional applications or uses not set forth herein.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A remotely-alterable electronic-ink based display device for displaying graphical indicia, comprising:
    an addressable display assembly including a layer of electronic ink including a bi-stable non-volatile imaging material disposed between an activation layer and a transparent electrode layer located above said layer of electronic ink, for activating said layer of electronic ink at particular locations to display graphical indicia on the surface of said addressable display assembly, wherein said layer of electronic ink does not require electrical power to maintain the display of said graphical indicia;
    an antenna structure for sending and/or receiving electromagnetic signals carrying information corresponding to at least one of instructions, programs, data and graphical indicia to be displayed by said addressable display assembly;
    an integrated circuit structure having (i) a storage element for storing said instructions, programs and data, and (ii) a programmed processor in electrical communication with said addressable display assembly and said antenna structure, and using said programs to process said instructions and data for (a) determining the graphical indicia to be displayed by said addressable display assembly at any moment in time, (b) controlling and coordinating operation of said addressable display assembly, and (c) generating output signals for instructing said addressable display assembly to display the determined graphical indicia;
    a signal transmitting structure, operably connected to said integrated circuit structure and said antenna structure, for transmitting electromagnetic signals from said antenna structure to at least one remote activator module;
    a signal receiving structure, operably connected to said integrated circuit structure and said antenna structure, for receiving electromagnetic signals from said remote activator module, using said antenna structure;
    wherein said received electromagnetic signals carry information corresponding to at least one of said programs, said instructions, said data and said graphical indicia to be displayed by said addressable display assembly;
    an on-board battery power structure, operably connected to said integrated circuit structure, for supplying electrical power to said integrated circuit structure;
    wherein said integrated circuit structure is responsive to electromagnetic signals received from said remote activator module by said antenna structure and said signal receiving structure;
    wherein said addressable display assembly is responsive to said output signals generated by said programmed processor, to display the determined graphical indicia; and
    wherein said antenna structure, said integrated circuit structure, said signal transmitting structure, said signal receiving structure and said on-board battery power structure are arranged and stacked together behind and within the spatial extent of said addressable display assembly so as to form said remotely-alterable electronic-ink based display device having a stacked construction.

2. The remotely-alterable electronic-ink based display device of claim 1, wherein each said remote activator receives electromagnetic signals from said antenna structure, carrying a variety of information, including the status of the graphical indicia displayed by said electronic-ink based display device, as well as any other information suitable to be employed by said remote activator module.

3. The remotely-alterable electronic-ink based display device of claim 1, wherein said signal transmitting structure and said signal receiving structure are realized as a signal transceiving structure.

4. The remotely-alterable electronic-ink based display device of claim 1, which comprises a protection layer disposed over said layer of electronic ink in order to prevent said addressable display assembly from inadvertent physical trauma or environmental damage.

5. The remotely-alterable electronic-ink based display device of claim 1, wherein said activation layer comprises an activation matrix, disposed on a support structure, to form a plurality of addressable pixel locations, wherein each said addressable pixel location is addressable by said programmed processor.

6. The electronic-ink based display device of claim 5, wherein said programmed processor controls, addresses, alters or changes each pixel location in said activation matrix to form at least one human and machine readable graphical indicia within said layer of electronic ink.

7. The remotely-alterable electronic-ink based display device of claim 5, wherein said electronic ink comprises an arrangement of microcapsules disposed between said transparent electrode layer and said activation layer, and wherein each said microcapsule has disposed therein an electrophoretic composition of a fluid, and a suspension of colored or charged particles or colloidal material.

8. The electronic-ink based display device of claim 7, wherein said activation matrix has patterns designed to provide sufficient power at selected pixel locations to form said graphical indicia.

9. The remotely-alterable electronic-ink based display device of claim 8, wherein the said patterns include shapes selected from the group consisting of quadrilateral shape matrices, intersecting arcs, and linear and non-linear patterns.

10. The remotely-alterable electronic-ink based display device of claim 7, wherein said fluid comprises a dielectric or emulsion fluid.

11. The remotely-alterable electronic-ink based display device of claim 7, wherein a potential difference produced across said activation layer and said transparent electrode layer causes particles within the microcapsules of said layer of electronic ink, to migrate towards one of said electrodes, thereby changing the color of said microcapsules, and thus the pixel location, as viewed by an individual.

12. The remotely-alterable electronic-ink based display device of claim 11, wherein said microcapsules can be filled with electrically-charged white colored particles suspended in a black or colored dye.

13. The remotely-alterable electronic-ink based display device of claim 12, wherein said programmed processor is configured to employ a combination of locally stored or generated instructions and externally received instructions so as to determine a subset of the locally stored information transmitted by said remote activator module, for display on said addressable display device.

14. The remotely-alterable electronic-ink based display device of claim 5, wherein said remote activator module is configured to transmit or receive, by way of electromagnetic signal transmission, commands, instructions, software programs, and parameters or variables associated with either (i) pixel address locations of said addressable display assembly, (ii) the graphical indicia displayed on the surface of said addressable display assembly, or (iii) instructions for subsequent use by said electronic-ink based display device.

15. The remotely-alterable electronic-ink based display device of claim 5, wherein said electronic ink comprises an arrangement of microcapsules disposed between said transparent electrode layer and said activation layer, and wherein each said microcapsule has disposed therein an electrophoretic composition of a fluid, and a suspension of colored or charged particles or colloidal material.

16. The remotely-alterable electronic-ink based display device of claim 15, wherein said fluid comprises a dielectric or emulsion fluid.

17. The remotely-alterable electronic-ink based display device of claim 15, wherein said graphical indicia is displayed on the surface of said addressable display assembly, in human and/or machine readable form.

18. The remotely-alterable electronic-ink based display device of claim 15, wherein said remote activator module employs a processor arranged with a receiver, a transmitter, and an antenna device.

19. The remotely-alterable electronic-ink based display device of claim 1, wherein said layer of electronic ink comprises rotatable balls rotatable to expose a different colored surface area, and migratable between a forward viewing position and a rear non-viewing position.

20. The remotely-alterable electronic-ink based display device of claim 1, wherein said electronic ink is configured as a single color, such as black, white or clear, or as a fluorescent, iridescent, bioluminescent, incandescent, ultraviolet, infrared, or other wavelength specific radiation absorbing or emitting material.

21. The remotely-alterable electronic-ink based display device of claim 1, wherein said graphical indicia is displayed on the surface of said addressable display assembly, in human and/or machine readable form.

22. The remotely-alterable electronic-ink based display device of claim 1, wherein said remote activator module employs a processor arranged with a receiver, a transmitter, and an antenna device.

23. The remotely-alterable electronic-ink based display device of claim 22, wherein said receiver and said transmitter in said remote activator module are combined into a single transceiver device for both sending and receiving electromagnetic signals.

24. The remotely-alterable electronic-ink based display device of claim 1, wherein said storage element comprises a volatile or non-volatile memory element, or combinations thereof, such as RAM, ROM, EPROM, or EEPROM.

25. The remotely-alterable electronic-ink based display device of claim 1, wherein said programmed processor and said storage element co-operate to retrieve data stored in said storage element, corresponding to the graphical indicia to be displayed by said addressable display assembly.

26. The remotely-alterable electronic-ink based display device of claim 1, wherein said programmed processor executes one or more preprogrammed sequences stored locally within said storage element to determine which graphical indicia is to be displayed by said addressable display element, and generates output signals to activate said addressable display device to display said graphical indicia based on said executed preprogrammed sequences.

27. The remotely-alterable electronic-ink based display device of claim 1, wherein said programmed processor processes instructions received by said remote activator module, to generate output signals to activate said addressable display device to display said graphical indicia based on processed instructions.

28. The remotely-alterable electronic-ink based display device of claim 1, wherein said transmitted and received electromagnetic signals are radio frequency (RF) based electromagnetic signals transmitted and received between said remotely-alterable electronic-ink based display device and said remote activator module.

29. The remotely-alterable electronic-ink based display device of claim 1, in combination with said remote activator module, to provide a remotely-controllable electronic-ink based display system.

30. A remotely-alterable electronic-ink based display device for displaying graphical indicia, comprising:

an addressable display assembly including a layer of electronic ink including a bi-stable non-volatile imaging material disposed between an activation layer and a transparent electrode layer located above said layer of electronic ink, for activating said layer of electronic ink at particular locations to display graphical indicia on the surface of said addressable display assembly, wherein said layer of electronic ink does not require electrical power to maintain the display of said graphical indicia;

an antenna structure for transmitting and/or receiving electromagnetic signals carrying information corresponding to at least one of instructions, programs, data and graphical indicia to be displayed by said addressable display assembly;

an integrated circuit structure having (i) a storage element for storing said instructions, programs and data, and (ii) a programmed processor in electrical communication with said addressable display assembly and said antenna structure, and using said programs to process said instructions and data for (a) determining the graphical indicia to be displayed by said addressable display assembly, (b) controlling and coordinating operation of said addressable display assembly, and (c) generating output signals for instructing said addressable display assembly to display the determined graphical indicia;

a signal transceiving structure, operably connected to said integrated circuit structure and said antenna structure, for transmitting electromagnetic signals from said antenna structure to at least one remote activator module, and for receiving electromagnetic signals from said remote activator module, using said antenna structure;

an on-board battery power structure, operably connected to said integrated circuit structure, for supplying electrical power to said integrated circuit structure;

wherein said integrated circuit structure is responsive to electromagnetic signals received from said remote activator module by said antenna structure and said signal transceiving structure;

wherein said addressable display assembly is responsive to said output signals generated by said programmed processor, to display the determined graphical indicia; and wherein said antenna structure, said integrated circuit structure, said signal transceiving structure, and said on-board battery power structure are arranged and stacked together to form said remotely-alterable electronic-ink based display device having a stacked architecture.

31. The remotely-alterable electronic-ink based display device of claim 30, wherein said signal transceiving structure comprises a signal transmitting structure and said signal receiving structure.

32. The remotely-alterable electronic-ink based display device of claim 30, which comprises a protection layer disposed over said layer of electronic ink in order to prevent said addressable display assembly from inadvertent physical trauma or environmental damage.

33. The remotely-alterable electronic-ink based display device of claim 30, wherein said activation layer comprises an activation matrix, disposed on a support structure, to form a plurality of addressable pixel locations, wherein each said addressable pixel location is addressable by said programmed processor.

34. The remotely-alterable electronic-ink based display device of claim 30, wherein said storage element comprises a volatile or non-volatile memory element, or combinations thereof, such as RAM, ROM, EPROM, or EEPROM.

35. The remotely-alterable electronic-ink based display device of claim 30, wherein said programmed processor executes one or more preprogrammed sequences stored locally within said storage element to determine which graphical indicia is to be displayed by said addressable display element, and generates output signals to activate said addressable display device to display said graphical indicia based on said executed preprogrammed sequences.

36. The remotely-alterable electronic-ink based display device of claim 30, wherein said transmitted and received electromagnetic signals are radio frequency (RF) based electromagnetic signals transmitted and received between said remotely-alterable electronic-ink based display device and said remote activator module.

* * * * *